(12) United States Patent
Kim et al.

(10) Patent No.: US 11,180,695 B2
(45) Date of Patent: Nov. 23, 2021

(54) CADMIUM FREE QUANTUM DOTS, AND COMPOSITE AND DISPLAY DEVICE INCLUDING THE SAME

(71) Applicant: SAMSUNG ELECTRONICS CO., LTD., Suwon-si (KR)

(72) Inventors: Tae Gon Kim, Hwaseong-si (KR); Seonmyeong Choi, Suwon-si (KR); Shin Ae Jun, Seongnam-si (KR); Hyeyeon Yang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/914,601

(22) Filed: Jun. 29, 2020

(65) Prior Publication Data
US 2020/0407635 A1  Dec. 31, 2020

(30) Foreign Application Priority Data

Jun. 28, 2019 (KR) .......................... 10-2019-0078386

(51) Int. Cl.
  *C09K 11/88* (2006.01)
  *C09K 11/08* (2006.01)
  (Continued)

(52) U.S. Cl.
  CPC ............ *C09K 11/883* (2013.01); *C09K 11/02* (2013.01); *C09K 11/0883* (2013.01);
  (Continued)

(58) Field of Classification Search
  CPC ... C09K 11/02; C09K 11/883; C09K 11/0883; C09K 11/62; C09K 11/025; C09K 11/70;
  (Continued)

(56) References Cited

U.S. PATENT DOCUMENTS 9,637,683 B2  5/2017  Lee et al.
10,066,161 B2  9/2018  Curley et al.
(Continued)

FOREIGN PATENT DOCUMENTS

CN  106701059 A  5/2017
CN  107338048 A  11/2017
(Continued)

OTHER PUBLICATIONS

Francesca Pietra et al., "Ga for Zn Cation Exchange Allows for Highly Luminescent and Photostable InZnP-Based Quantum Dots," Chemistry of Materials, Jun. 6, 2017, pp. 5192-5199, vol. 29, DOI: 10.1021/acs.chemmater.7b00848.
(Continued)

*Primary Examiner* — C Melissa Koslow
(74) *Attorney, Agent, or Firm* — Cantor Colburn LLP

(57) ABSTRACT

A quantum dot and a quantum dot-polymer composite and a device including the same, wherein the quantum dot includes a semiconductor nanocrystal core including indium (In), gallium (Ga), and phosphorous (P), a first semiconductor nanocrystal shell disposed on the semiconductor nanocrystal core, the first semiconductor nanocrystal shell including zinc and selenium, and a second semiconductor nanocrystal shell disposed on the first semiconductor nanocrystal shell, the second semiconductor nanocrystal shell including zinc and sulfur, wherein the quantum dot does not include cadmium, wherein the quantum dot emits green light, wherein in the quantum dot, a mole ratio of gallium with respect to a sum of indium and gallium is less than or equal to about 0.5:1, and wherein in the quantum dot, a mole ratio of sulfur with respect to selenium is less than or equal to about 2.5:1.

27 Claims, 12 Drawing Sheets

(51) Int. Cl.
  *C09K 11/02*    (2006.01)
  *C09K 11/62*    (2006.01)
  *B82Y 40/00*    (2011.01)
  *B82Y 20/00*    (2011.01)

(52) U.S. Cl.
  CPC ............... *C09K 11/62* (2013.01); *B82Y 20/00* (2013.01); *B82Y 40/00* (2013.01)

(58) Field of Classification Search
  CPC ....... C09K 11/565; B82Y 20/00; B82Y 40/00; H01L 27/322; H01L 27/3244
  See application file for complete search history.

(56) References Cited

U.S. PATENT DOCUMENTS

| | | | |
|---|---|---|---|
| 10,162,259 B2 | 12/2018 | Nam et al. | |
| 10,364,391 B2 | 7/2019 | Jang et al. | |
| 10,450,507 B2 | 10/2019 | Jang et al. | |
| 2008/0246388 A1 | 10/2008 | Kwang-Ohk et al. | |
| 2019/0362656 A1* | 11/2019 | Saitoh | G09F 9/301 |
| 2020/0325395 A1* | 10/2020 | Curley | G02F 1/133308 |

FOREIGN PATENT DOCUMENTS

| | | |
|---|---|---|
| CN | 108384531 A | 8/2018 |
| JP | 2018128590 A | 8/2018 |
| KR | 20130022639 A | 3/2013 |
| KR | 20130080333 A | 7/2013 |
| KR | 1355120 B1 | 1/2014 |
| KR | 20140121217 A | 10/2014 |
| KR | 20150111307 A | 10/2015 |
| KR | 20160091523 A | 8/2016 |
| KR | 20170026963 A | 3/2017 |
| KR | 1739751 B1 | 5/2017 |
| KR | 1797366 B1 | 11/2017 |
| KR | 20180016196 A | 2/2018 |
| KR | 20180030353 A | 3/2018 |
| KR | 1852459 B1 | 4/2018 |
| KR | 20180088552 A | 8/2018 |

OTHER PUBLICATIONS

Joong Pill Park et al., "Highly luminescent InP/GaP/ZnS QDs emitting in the entire color range via a heating up process," Nature, Scientific Reports, Jul. 20, 2016, pp. 1-6, DOI: 10.1038/srep30094.

Sungwoo Kim et al., "Highly Luminescent InP/GaP/ZnS Nanocrystals and Their Application to White Light-Emitting Diodes," Journal of the American Chemical Society, Oct. 5, 2018, pp. 3804-3809, vol. 134.

V. M. Menon et al., "Lasing from InGaP quantum dots in a spin-coated flexible microcavity," Optics Express, Nov. 11, 2008, pp. 19535-19540, vol. 16, No. 24.

* cited by examiner

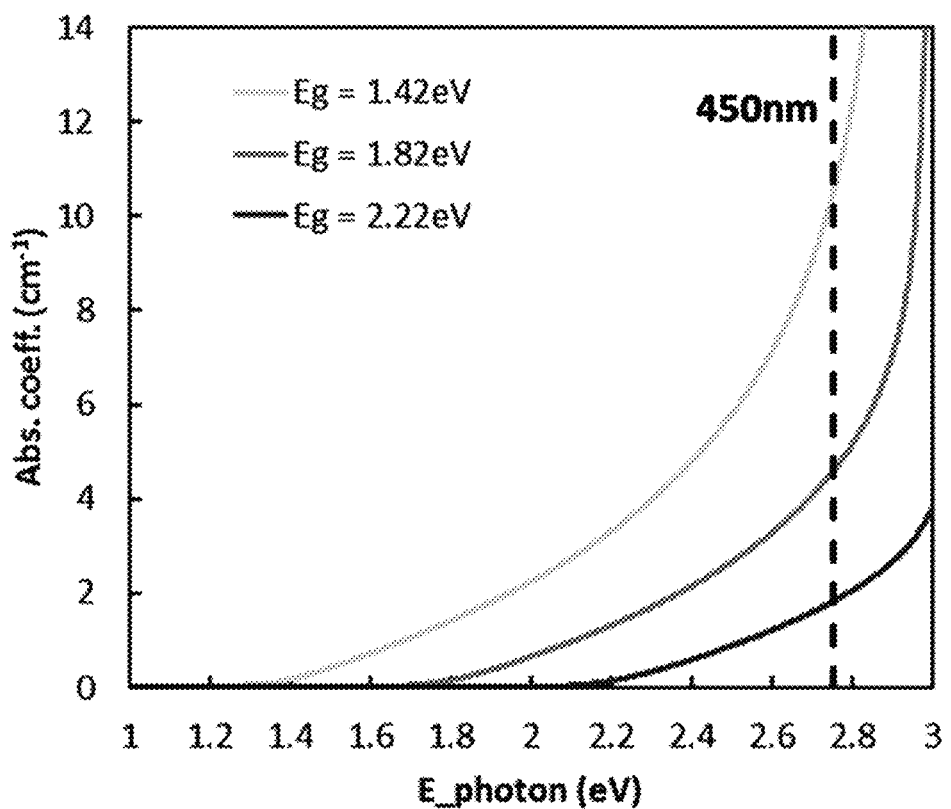

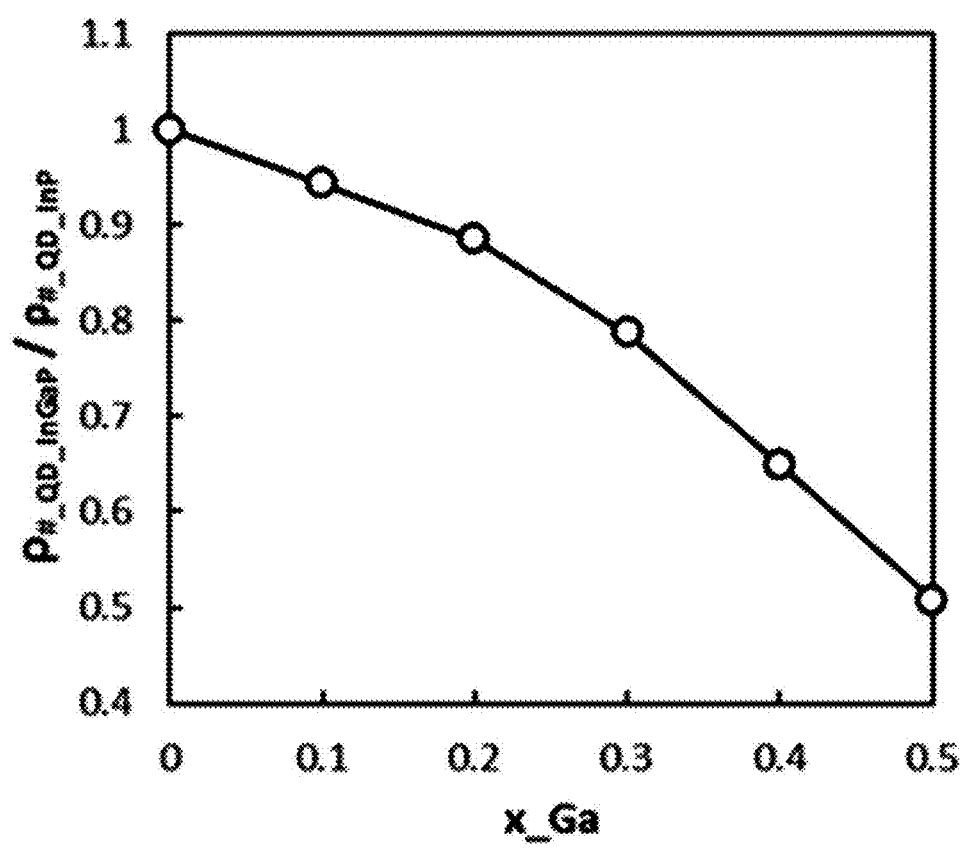

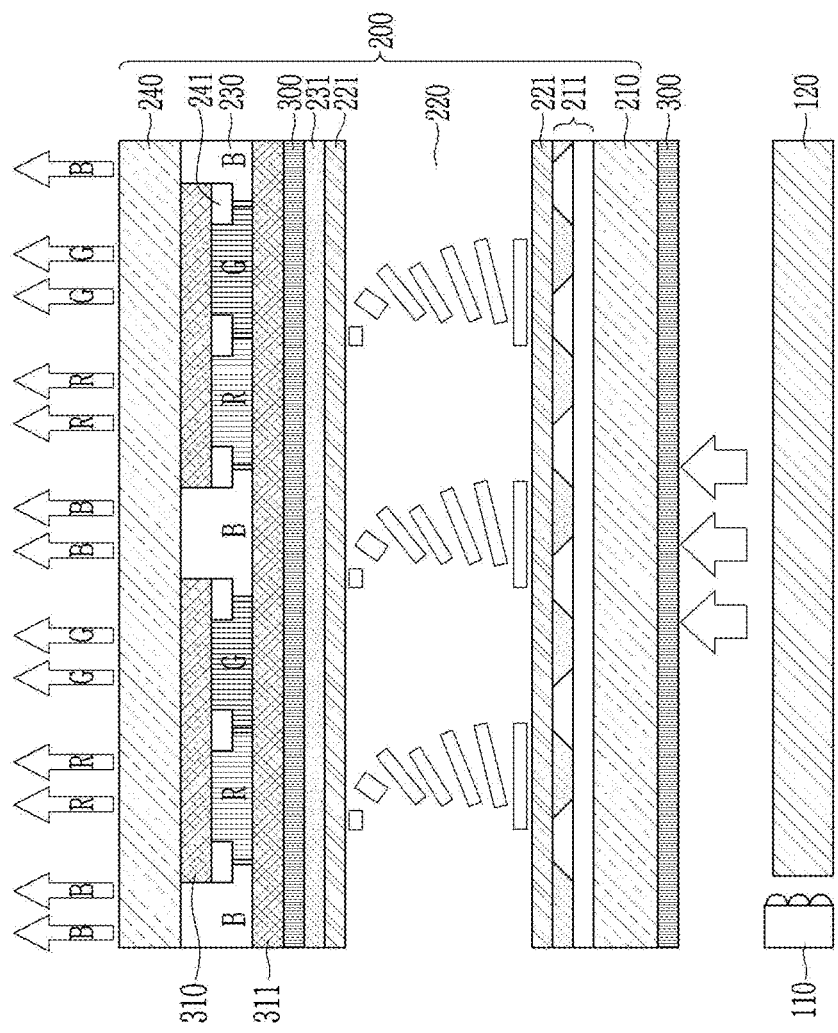

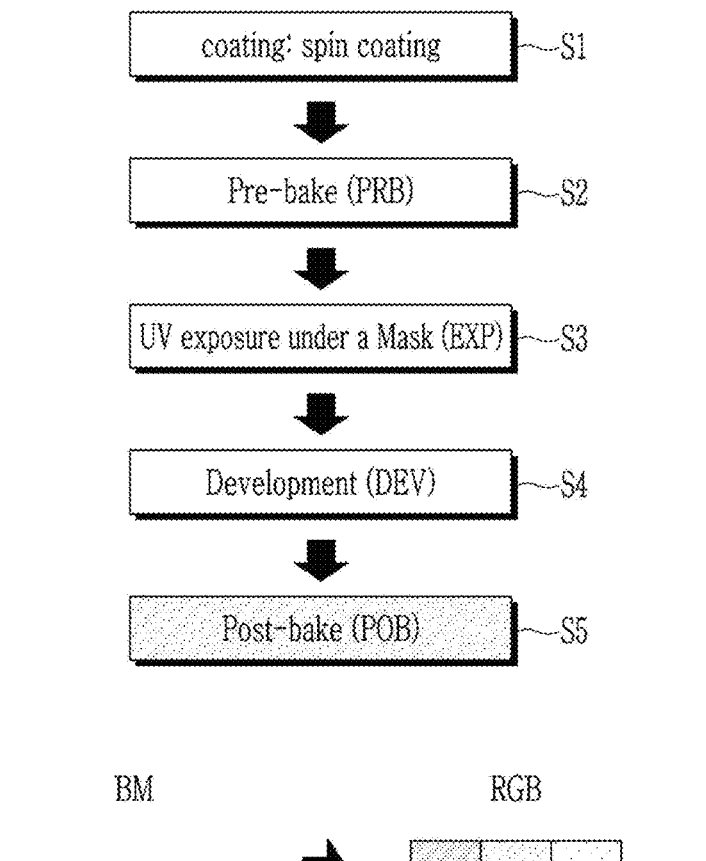

CADMIUM FREE QUANTUM DOTS, AND COMPOSITE AND DISPLAY DEVICE INCLUDING THE SAME

CROSS-REFERENCE TO RELATED APPLICATION

This application claims priority to and the benefit of Korean Patent Application No. 10-2019-0078386, filed in the Korean Intellectual Property Office on Jun. 28, 2019, and all the benefits accruing therefrom under 35 U.S.C. § 119, the content of which in its entirety is herein incorporated by reference.

BACKGROUND

1. Field

Cadmium free quantum dots, a composition or composite including same, and an electronic device (e.g., display devices) including the same are disclosed.

2. Description of the Related Art

Unlike a bulk material, quantum dots (e.g., nano-sized semiconductor nanocrystals) may have different bandgap energies by controlling the sizes and compositions of the quantum dots. Quantum dots may exhibit electroluminescent and photoluminescent properties. In a colloidal synthesis, organic materials such as a dispersing agent may coordinate, e.g., be bound, to a surface of the semiconductor nanocrystal during the crystal growth thereof, and a quantum dot having a controlled size and having luminescent properties may be provided. Luminescent properties of the quantum dots may be utilized in many fields. From an environmental standpoint, developing a cadmium free quantum dot with improved luminescent properties is desirable.

SUMMARY

An embodiment provides a quantum dot (or quantum dots) that may exhibit improved photoluminescence properties and enhanced stability.

An embodiment provides a composition including the aforementioned quantum dot(s).

An embodiment provides a quantum dot-polymer composite including the aforementioned quantum dot(s).

An embodiment provides a layered structure and an electronic device (e.g., a display device) including the aforementioned quantum dot-polymer composite.

In an embodiment, a quantum dot includes a semiconductor nanocrystal core including indium (In), gallium (Ga), and phosphorous (P), a first semiconductor nanocrystal shell disposed on the semiconductor nanocrystal core, the first semiconductor nanocrystal shell including zinc and selenium, and a second semiconductor nanocrystal shell disposed on the first semiconductor nanocrystal shell, the second semiconductor nanocrystal shell including zinc and sulfur, wherein the quantum dot does not include cadmium,
wherein the quantum dot emits green light, and
wherein in the quantum dot, a mole ratio of gallium with respect to a sum of indium and gallium is less than or equal to about 0.5:1, and
a mole ratio of sulfur with respect to selenium (S/Se) is less than or equal to about 2.5:1.

The semiconductor nanocrystal core may include an indium gallium phosphide (InGaP) alloy.

A maximum luminescent peak of the green light may be present in a range from about 500 nanometers (nm) to about 550 nm. A wavelength of the maximum photoluminescent peak may be greater than or equal to about 525 nm and less than or equal to about 540 nm.

In an ultraviolet-visible (UV-Vis) absorption spectrum of the quantum dot, a ratio of an absorption intensity at 450 nm to an absorption intensity at 350 nm may be greater than or equal to about 0.08:1.

In an ultraviolet-visible (UV-Vis) absorption spectrum of the quantum dot, a ratio of an absorption intensity at 450 nm to an absorption intensity at 350 nm may be greater than or equal to about 0.09:1.

In the quantum dot, a mole ratio of zinc with respect to a sum of indium and gallium may be less than or equal to about 45:1, or less than or equal to about 30:1.

In the quantum dot, a mole ratio of zinc with respect to a sum of indium and gallium may be greater than or equal to about 10:1.

In the quantum dot, a mole ratio of sulfur with respect to selenium may be less than or equal to about 2:1, less than or equal to about 1.4:1, less than or equal to about 1:1, less than or equal to about 0.9:1, less than or equal to about 0.8:1, less than or equal to about 0.7:1, or less than or equal to about 0.5:1.

In the quantum dot, a mole ratio of sulfur with respect to selenium may be greater than or equal to about 0.1:1, greater than or equal to about 0.3:1, greater than or equal to about 0.5:1, greater than or equal to about 0.7:1, greater than or equal to about 0.9:1, or greater than or equal to about 1:1.

In the quantum dot, a mole ratio of a sum of indium and gallium with respect to a sum of selenium and sulfur may be greater than or equal to about 0.03:1, greater than or equal to about 0.04:1, greater than or equal to about 0.05:1, greater than or equal to about 0.07:1, greater than or equal to about 0.09:1, or greater than or equal to about 0.1:1.

In the quantum dot, a mole ratio of a sum of indium and gallium with respect to a sum of selenium and sulfur may be less than or equal to about 0.2:1, less than or equal to about 0.15:1, or less than or equal to about 0.1:1.

A thickness of the first semiconductor nanocrystal shell may be greater than or equal to about 3 monolayers.

A thickness of the second semiconductor nanocrystal shell may be less than about 0.7 nm.

A thickness of the first semiconductor nanocrystal shell may be greater than or equal to about 0.9 nm, greater than or equal to about 1 nm, greater than or equal to about 1.1 nm, greater than or equal to about 1.2 nm, greater than or equal to about 1.3 nm, or greater than or equal to about 1.4 nm.

A thickness of the first semiconductor nanocrystal shell may be less than or equal to about 1.4 nm.

A thickness of the second semiconductor nanocrystal shell may be less than or equal to about 0.6 nm.

A quantum efficiency (or quantum yield) of the quantum dot may be greater than or equal to about 65% or greater than or equal to about 70%.

The first semiconductor nanocrystal shell may not include sulfur. The first semiconductor nanocrystal shell may be disposed directly on a surface of the semiconductor nanocrystal core. The second semiconductor nanocrystal shell may be an outermost layer of the quantum dot. The second semiconductor nanocrystal shell may be disposed directly on a surface of the first semiconductor nanocrystal shell.

A size (or an average size) of the semiconductor nanocrystal core may be greater than or equal to about 2 nm, greater than or equal to about 2.2 nm, greater than or equal to about 2.3 nm, greater than or equal to about 2.4 nm, greater than or equal to about 2.5 nm, or greater than or equal to about 2.6 nm.

A size (or an average size) of the semiconductor nanocrystal core may be less than or equal to about 4 nm, less than or equal to about 3.9 nm, less than or equal to about 3.8 nm, less than or equal to about 3.7 nm, less than or equal to about 3.6 nm, less than or equal to about 3.5 nm, less than or equal to about 3.4 nm, less than or equal to about 3.3 nm, or less than or equal to about 3.2 nm.

A size (or an average size) of the quantum dot may be greater than or equal to about 5 nm, greater than or equal to about 5.5 nm, greater than or equal to about 6 nm, or greater than or equal to about 6.5 nm.

A size (or an average size) of the quantum dot may be less than or equal to about 10 nm, less than or equal to about 9 nm, less than or equal to about 8 nm, or less than or equal to about 7 nm.

In an embodiment, a composition includes (e.g., a plurality of) the aforementioned quantum dot(s), a dispersing agent, and a (organic) solvent. The dispersing agent may include a carboxylic acid group containing binder polymer. The composition may further include a (photo)polymerizable monomer including a carbon-carbon double bond and optionally a (thermal or photo) initiator.

In an embodiment, a quantum dot-polymer composite includes a polymer matrix and (e.g., a plurality of) the aforementioned quantum dot(s) dispersed in the polymer matrix.

The polymer matrix may include a linear polymer, a crosslinked polymer, or a combination thereof.

The polymer matrix may include a carboxylic acid group containing binder polymer.

The carboxylic acid group containing binder polymer may include:

a copolymer of a monomer mixture including a first monomer including a carboxylic acid group and a carbon-carbon double bond, a second monomer including a carbon-carbon double bond and a hydrophobic moiety and not including a carboxylic acid group, and optionally a third monomer including a carbon-carbon double bond and a hydrophilic moiety and not including a carboxylic acid group;

a multiple aromatic ring-containing polymer including a backbone structure in which two aromatic rings are bound to a quaternary carbon atom that is a constituent atom of another cyclic moiety in a main chain of the backbone structure, the multiple aromatic ring-containing polymer including a carboxylic acid group (—COOH);

or a combination thereof.

The polymer matrix may further include a polymerization product of a monomer combination including an ene compound including a carbon-carbon double bond and a mono- or poly-thiol compound including a, e.g., at least one (or at least two), thiol group(s) (e.g., at a terminal end of the thiol compound), a metal oxide fine particle, or a combination thereof.

The quantum dot-polymer composite may be in a form of a patterned film.

The quantum dot polymer composite may exhibit an absorption rate (e.g., for blue light of a wavelength of about 450 nanometers) of greater than or equal to about 87%, or greater than or equal to about 89% when it is in a form of a film having a thickness of about 6 micrometers (um) and an amount of the quantum dots included therein is less than or equal to about 45 wt % based on a total weight of the quantum dot-polymer composite.

In an embodiment, a display device includes a light source and a light emitting element, wherein the light emitting element includes the aforementioned quantum dot-polymer composite and the light source is configured to provide the light emitting element with incident light.

The incident light may have a luminescence peak wavelength of about 440 nanometers to about 460 nanometers.

In an embodiment, the light emitting element may include a sheet including the quantum dot-polymer composite.

In an embodiment, the light emitting element may include a stacked structure including a substrate and a light emitting layer disposed on the substrate, wherein the light emitting layer includes the quantum dot-polymer composite or a pattern including the quantum dot-polymer composite.

The pattern may include at least one repeating section configured to emit light having a predetermined wavelength.

The pattern may include a first section configured to emit a first light.

The pattern may further include a second section configured to emit a second light having a center wavelength that is different from a center wavelength of the first light.

In an embodiment, a method of producing a quantum dot is provided, wherein the method includes:

adding a semiconductor nanocrystal core and a selenium containing precursor to a first mixture to obtain a second mixture, the semiconductor nanocrystal core comprising indium, gallium, and phosphorous, the first mixture comprising a first shell precursor containing zinc, an organic ligand, and an organic solvent;

heating the second mixture to a first reaction temperature to obtain a third mixture, the third mixture comprising a particle comprising a first semiconductor nanocrystal shell on the semiconductor nanocrystal core, the first semiconductor nanocrystal shell comprising zinc and selenium; and adding a sulfur containing precursor to the third mixture at the first reaction temperature to form a second semiconductor nanocrystal shell on the first semiconductor nanocrystal shell, wherein an amount of selenium per one mole of indium in the second mixture is greater than or equal to about 3 moles and less than or equal to about 20 moles, and wherein an amount of sulfur per one mole of a sum of indium and gallium in the third mixture is greater than or equal to about 2 moles and less than or equal to about 45 moles.

Quantum dots of an embodiment may exhibit improved luminous properties together with enhanced (process) stability. The quantum dots may be used in various field such as in a display devices, biological labelling (e.g., bio sensor, bio imaging, etc.), a photo detector, a solar cell, a hybrid composite, or the like.

The quantum dots of an embodiment may exhibit enhanced excitation light (e.g., blue light) absorption, and may be used in a quantum dot based photoluminescent color filter. The photoluminescent color filter may be used in a display device (or a liquid crystal display (LCD) device) that includes various light sources (e.g., emitting blue light such as a blue light emitting organic light emitting diode (OLED), a micro light emitting diode (LED) emitting blue light, or blue LED). The photoluminescent color filter may be used in a television (TV), a monitor, a mobile device, a virtual reality/augmented reality (VR/AR) device, a display for an automotive application component, or the like.

BRIEF DESCRIPTION OF THE DRAWINGS

These and/or other aspects will become apparent and more readily appreciated from the following description of the embodiments, taken in conjunction with the accompanying drawings in which:

FIG. 2B is a graph of absorption coefficient (Abs. coeff. (inverse centimeters ($cm^{-1}$)) versus photon energy (E_photon (eV)) for each of the materials shown in FIG. 2A.

FIG. 3C is a graph of relative density of a number of quantum dots included in a given weight of a quantum dot composite ($\rho_{\#\_QD\_InGaP}/\rho_{\#\_QD\_InP}$) versus a gallium mole fraction (x_Ga) of the $In_{1-x}Ga_xP$ core wherein x is greater than or equal to 0, when the quantum dot composite includes a plurality of the quantum dots having a cross-section illustrated in FIG. 3A and emitting light of a wavelength of about 540 nm.

FIG. 5 is a cross-sectional view of a display device according to an embodiment; and FIG. 6 shows a process of producing a quantum dot-polymer composite pattern using a composition according to an embodiment.

DETAILED DESCRIPTION

Figure 1:
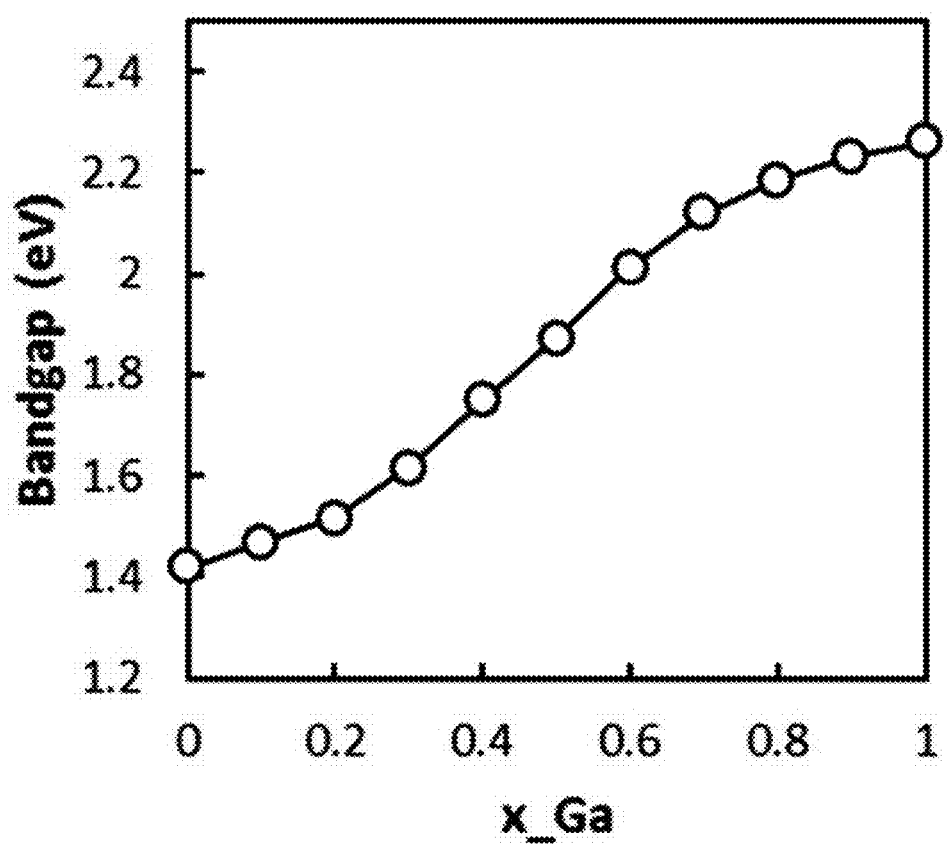
FIG. 1 is a graph of a bulk band-gap (electronvolts (eV)) versus a gallium mole fraction (x_Ga) in an $In_{1-x}Ga_xP$ compound.

Advantages and characteristics of this disclosure, and a method for achieving the same, will become evident referring to the following example embodiments together with the drawings attached hereto. However, the embodiments should not be construed as being limited to the embodiments set forth herein. If not defined otherwise, all terms (including technical and scientific terms) in the specification may be defined as commonly understood by one skilled in the art. The terms defined in a generally-used dictionary may not be interpreted ideally or exaggeratedly unless clearly defined. In addition, unless explicitly described to the contrary, the word "comprise" and variations such as "comprises" or "comprising" will be understood to imply the inclusion of stated elements but not the exclusion of any other elements.

Further, the singular includes the plural unless mentioned otherwise.

In the drawings, the thickness of layers, films, panels, regions, etc., are exaggerated for clarity. Like reference numerals designate like elements throughout the specification.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

"About" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, unless a definition is otherwise provided, the term "substituted" refers to a compound or a group or a moiety wherein at least one hydrogen atom thereof is substituted with a substituent. The substituent may include a C1 to C30 alkyl group, a C2 to C30 alkenyl group, a C2 to C30 alkynyl group, a C6 to C30 aryl group, a C7 to C30 alkylaryl group, a C1 to C30 alkoxy group, a C1 to C30 heteroalkyl group, a C3 to C40 heteroaryl group, a C3 to C30 heteroalkylaryl group, a C3 to C30 cycloalkyl group, a C3 to C15 cycloalkenyl group, a C6 to C30 cycloalkynyl group, a C2 to C30 heterocycloalkyl group, a halogen (—F, —Cl, —Br, or —I), a hydroxy group (—OH), a nitro group (—NO$_2$), a cyano group (—CN), an amino group or amine group (—NRR', wherein R and R' are the same or different, and are independently hydrogen or a C1 to C6 alkyl group), an azido group (—N$_3$), an amidino group (—C(=NH)NH$_2$), a hydrazino group (—NHNH$_2$), a hydrazono group (=N(NH$_2$)), an aldehyde group (—C(=O)H), a carbamoyl group (—C(O)NH$_2$), a thiol group (—SH), an ester group (—C(=O)OR, wherein R is a C1 to C6 alkyl group or a C6 to C12 aryl group), a carboxylic acid group (—COOH) or a salt thereof (—C(=O)OM, wherein M is an organic or inorganic cation), a sulfonic acid group (—SO$_3$H) or a salt thereof (—SO$_3$M, wherein M is an organic or inorganic cation), a phosphoric acid group (—PO$_3$H$_2$) or a salt thereof (—PO$_3$MH or —PO$_3$M$_2$, wherein M is an organic or inorganic cation), or a combination thereof.

As used herein, unless a definition is otherwise provided, the term "hetero" refers to a compound or group that includes at least one (e.g., one to three) heteroatom(s), wherein the heteroatom(s) is each independently N, O, S, Si, P, or a combination thereof.

As used herein, unless a definition is otherwise provided, the term "alkylene group" refers to a straight or branched chain, saturated aliphatic hydrocarbon group having a valence of at least two. The alkylene group may be optionally substituted with one or more substituents.

As used herein, unless a definition is otherwise provided, the term "arylene group" refers to a functional group having a valence of at least two and formed by the removal of at least two hydrogen atoms from one or more rings of an aromatic hydrocarbon, wherein the hydrogen atoms may be removed from the same or different rings (preferably different rings), each of which rings may be aromatic or nonaromatic. The arylene group may be optionally substituted with one or more substituents.

As used herein, unless a definition is otherwise provided, the term "(meth)acrylate" refers to acrylate, methacrylate, or a combination thereof. The (meth)acrylate may include a (C1 to C10 alkyl)acrylate, a (C1 to C10 alkyl)methacrylate, or a combination thereof.

As used herein, unless a definition is otherwise provided, "aliphatic" refers to a saturated or unsaturated linear or branched hydrocarbon. An aliphatic group may be an alkyl, alkenyl, or alkynyl group, for example.

As used herein, unless a definition is otherwise provided, "alkane" refers to a straight or branched chain saturated hydrocarbon.

As used herein, unless a definition is otherwise provided, "alkene" refers to a straight or branched chain hydrocarbon having at least one carbon-carbon double bond.

As used herein, unless a definition is otherwise provided, "alkyne" refers to a straight or branched chain hydrocarbon having at least one carbon-carbon triple bond.

As used herein, unless a definition is otherwise provided, "alkenyl" refers to a linear or branched monovalent hydrocarbon having one or more carbon-carbon double bond.

As used herein, unless a definition is otherwise provided, "alkoxy" refers to an alkyl group that is linked via an oxygen (i.e., alkyl-O—), for example methoxy, ethoxy, and sec-butyloxy groups.

As used herein, unless a definition is otherwise provided, "alkyl" refers to a straight or branched chain, saturated, monovalent hydrocarbon (e.g., methyl or hexyl).

As used herein, unless a definition is otherwise provided, "alkynyl" refers to a linear or branched monovalent hydrocarbon having one or more carbon-carbon triple bond.

As used herein, unless a definition is otherwise provided, "amino group" refers to a group of the general formula —N(R)$_2$, wherein each R is independently hydrogen, a C1 to C6 alkyl, or a C6 to C12 aryl.

As used herein, unless a definition is otherwise provided, "arene" refers to a hydrocarbon having an aromatic ring, and includes monocyclic and polycyclic hydrocarbons wherein the additional ring(s) of the polycyclic hydrocarbon may be aromatic or nonaromatic. Specific arenes include benzene, naphthalene, toluene, and xylene.

As used herein, unless a definition is otherwise provided, "aromatic" refers to an organic compound or group comprising at least one unsaturated cyclic group having delocalized pi electrons. The term encompasses both hydrocarbon aromatic compounds and heteroaromatic compounds.

As used herein, unless a definition is otherwise provided, "aryl" refers to a group formed by removal of at least one hydrogen from an aromatic hydrocarbon (e.g., a phenyl or naphthyl group).

As used herein, unless a definition is otherwise provided, "carbocyclic" refers to a cyclic group having at least one ring with only carbon atoms in the ring. One or more rings may be present, and each ring may be saturate, unsaturated, or aromatic.

As used herein, unless a definition is otherwise provided, "cycloalkenyl" refers to a monovalent hydrocarbon having one or more rings and one or more carbon-carbon double bond in the ring, wherein all ring members are carbon (e.g., cyclopentenyl and cyclohexenyl).

As used herein, unless a definition is otherwise provided, "cycloalkyl" refers to a monovalent hydrocarbon having one or more saturated rings in which all ring members are carbon (e.g., cyclopentyl and cyclohexyl).

As used herein, unless a definition is otherwise provided, "cycloalkynyl" refers to a stable aliphatic monocyclic or polycyclic group having at least one carbon-carbon triple bond, wherein all ring members are carbon (e.g., cyclohexynyl).

As used herein, unless a definition is otherwise provided, the prefix "halo" refers to a group or compound including one more of a fluoro, chloro, bromo, iodo, and astatino substituent. A combination of different halo groups (e.g., bromo and fluoro) can be present.

As used herein, unless a definition is otherwise provided, "heteroaryl" refers to a monovalent carbocyclic ring group that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently nitrogen (N), oxygen (O), phosphorus (P), sulfur (S), or silicon (Si).

As used herein, unless a definition is otherwise provided, "hydrocarbon" refers to an organic compound having at least one carbon atom and at least one hydrogen atom, wherein one or more of the hydrogen atoms can optionally be substituted and/or at least one of methylenes may be optionally replaced with a sulfonyl moiety, a carbonyl moiety, an ether moiety, a sulfide moiety, a sulfoxide moiety, an ester moiety, an amide moiety comprising hydrogen or a C1 to C10 alkyl group, or a combination thereof.

As used herein, unless a definition is otherwise provided, a "(meth)acryloyl" group is inclusive of an acryloyl group ($H_2C=CH-C(=O)-$) or a methacryloyl group ($H_2C=C(CH_3)-C(=O)-$)

As used herein, a light absorption rate refers to a percentage of an amount of light absorbed by a quantum dot-polymer composite with respect to an amount of incident light (e.g., blue light). The total amount of excitation light (B) is obtained by integration of a luminescence spectrum of the incident light, an amount (B') of incident light passing through the quantum dot-polymer composite film is obtained, and a light absorption rate is obtained by the following equation:

$$(B-B')/B \times 100\% = a \text{ light absorption rate (\%)}$$

In the specification, the term "Group" in Group III, Group II, or the like refers to a group of the Periodic Table of Elements.

As used herein, "Group I" refers to Group IA and Group IB, and may include Li, Na, K, Rb, and Cs but are not limited thereto.

As used herein, "Group II" refers to Group IIA and a Group IIB, and examples of the Group II metal may include Cd, Zn, Hg, and Mg, but are not limited thereto.

As used herein, "Group III" refers to Group IIIA and Group IIIB, and examples of the Group III metal may include Al, In, Ga, and Tl, but are not limited thereto.

As used herein, "Group IV" refers to Group IVA and Group IVB, and examples of the Group IV metal may include Si, Ge, and Sn but are not limited thereto. As used herein, the term "a metal" may include a semi-metal such as Si.

As used herein, "Group V" refers to Group VA and may include nitrogen, phosphorus, arsenic, antimony, and bismuth but is not limited thereto.

As used herein, "Group VI" refers to Group VIA and may include sulfur, selenium, and tellurium, but is not limited thereto.

As used herein, the term "first absorption peak wavelength" refers to a wavelength of a main excitonic peak appearing first from the longest wavelength region of a UV-vis absorption spectrum of a quantum dot (i.e., appearing in the lowest energy region in the UV-Vis absorption spectrum).

As used herein, unless a definition is otherwise provided, the phrase "gallium mole fraction" refers to a value for x in $In_{1-x}Ga_xP$, wherein x is greater than or equal 0. Accordingly, when x is zero, no gallium is present.

A quantum dot is a nano-sized crystalline semiconductor (nanoparticle) material. A quantum dot may have a large surface area per unit volume, exhibit a quantum confinement effect, and exhibit different characteristics from bulk materials having the same composition. Quantum dots may absorb light from an excitation source to be excited, and may emit energy corresponding to a bandgap energy of the quantum dots. Quantum dots have potential applicability in various devices (e.g., an electronic device) due to unique photoluminescence characteristics of the quantum dots.

Quantum dots having properties applicable to an actual electronic device may be cadmium-based. However, cadmium may cause a serious environment/health problem and thus is a restricted element. As a type of cadmium free quantum dot, there is a Group III-V-based nanocrystal. However, stability (e.g., chemical or thermal stability) of cadmium free quantum dots may be inferior to the stability of cadmium based quantum dots. When the cadmium free quantum dots undergo various processes in order to be applied to an electronic device, the cadmium free quantum dots may exhibit sharply decreased luminous properties.

In addition, for application in a display device, quantum dots may use blue light (e.g., having a wavelength of about 450 nm) as an excitation energy source. While cadmium based quantum dots may have a high level of blue light absorption, cadmium free quantum dots (e.g., emitting green light) may not have as high an absorption strength for blue light (e.g., having a wavelength of about 450 nm), and brightness of the display device may be decreased.

In the cadmium free quantum dot, introduction of a core-shell structure may contribute to securing, e.g., providing, a luminous property and stability. For example, an InP based core may be passivated with a ZnSe/ZnS shell of an increased thickness to be applied in a quantum dot-polymer composite pattern production. However, the present inventors have found that an increased thickness of a shell may be desirable to achieve an appropriate level of stability and luminous property while the increase in the shell thickness may also cause a sharp increase in a weight of each quantum dot, which may lead to a decrease in the number of quantum dots per a given weight and may cause a decrease in an excitation light absorption of a quantum dot-polymer composite.

The quantum dot may be dispersed in a host matrix (e.g., including a polymer, an inorganic material, or a combination thereof) to form a composite and thus be applied to a device. A quantum dot-polymer composite or a patterned film or form including a quantum dot-polymer composite may exhibit improved luminance, a wide viewing angle, and improved color reproducibility when included in a display device. However, the weight of the quantum dot that can be included in a given composite may be limited for various reasons related to a production process thereof. Thus, a decrease in a number density, e.g., number, of quantum dots in a given weight may be undesirable for example taking into consideration the absorption rate of excitation light.

When the quantum dot is used in a patterned film such as a color filter, the decrease in the excitation light absorption rate of the quantum dot may be a direct cause of a blue light leakage in a display device, which may adversely affect a color gamut (e.g., a coverage rate under a Digital Cinema Initiative (DCI) standard) of the device and may also result in a decrease of a luminous efficiency.

As a measure addressing a decreased absorption rate of the excitation light, a dye (e.g., a yellow dye) based blue light absorption layer may be disposed between the quantum dot color filter and a substrate. However, the insertion of the blue light absorption layer may result in a decrease of a utilization rate of blue light. In addition, despite the insertion of the blue light absorption layer, a light having a wavelength of less than 500 nm may leak from a green light pixel, which may in turn have an adverse effect on a color purity of the device. Accordingly, it is desired to develop a quantum dot having an enhanced absorption rate for excitation light together with a luminous efficiency of a desired level.

The present inventors have found that in case of a green light emitting quantum dot having an InP core and a ZnSe shell, the absorption of blue light at a wavelength of about 450 nm may be affected spatially not only by the core but also by the shell. The present inventors have found that the absorption degree of the blue light at about 450 nm may be affected by a core volume and a thickness of a shell having a predetermined thickness. However, as a core size may have a direct effect on the luminous wavelength of the quantum dot, a size of the InP core may have to be limited to a certain value. The present inventors have found that while a shell including a ZnSe may contribute to the absorption of light at a wavelength of about 450 nm, the absorption by the ZnSe based shell may exponentially decrease as the thickness increases. Therefore, when a thickness of the shell reaches a predetermined thickness (e.g., of greater than about 3 monolayers), the shell may contribute a minimal amount to the absorption of blue light and instead may cause a decrease of the absorption rate. However, when a thickness of the ZnSe shell is thin, an InP based quantum dot may exhibit a decreased luminous efficiency and thus despite an increased absorption rate, the final photoconversion rate of a quantum dot polymer composite may be decreased.

Accordingly, it is difficult for a quantum dot having an InP based core and a first shell including a ZnSe to achieve a desired level of luminous efficiency together with a desired level of absorption rate. In addition, in case of the indium phosphide based quantum dot, an absorption rate for light at a wavelength of about 450 nm is decreased in comparison with other quantum dot including a cadmium compound or a lead compound, thus a measure addressing such a drawback is desired.

The quantum dot of an embodiment may have the structure and composition that will be described below, and may exhibit enhanced optical properties (e.g., increased luminous efficiency, a ratio of the absorbance intensity at 450 nm with respect to the absorbance intensity at 350 nm, or a combination thereof) when it does not include a harmful heavy metal such as cadmium, lead, or a combination thereof. In addition, a quantum dot polymer composite including the quantum dot of an embodiment may provide relatively high absorption of blue light while it emits light of a desired wavelength (e.g., green light). As used herein, the term "quantum dot" may refer to a single particle or a plurality thereof.

A quantum dot of an embodiment does not include cadmium. The quantum dot includes a semiconductor nanocrystal core including indium (In), gallium (Ga), and phosphorous (P), a first semiconductor nanocrystal shell disposed on (e.g., directly on) the semiconductor nanocrystal core and including zinc and selenium, and a second semiconductor nanocrystal shell disposed on (e.g., directly on) the first semiconductor nanocrystal shell and including zinc and sulfur. As used herein, the expression that "not including cadmium" may refer to the case where a concentration of the cadmium may be less than or equal to about 100 ppm, less than or equal to about 50 ppm, less than or equal to about 10 ppm, or almost zero. In an embodiment, substantially no amount of the cadmium is present or, if present, an amount of the cadmium is less than or equal to a detection limit or as an impurity level of a given analysis tool (e.g., an inductively coupled plasma atomic emission spectroscopy).

In an embodiment, the quantum dot may emit green light. A maximum luminescent peak wavelength of the green light may be greater than or equal to about 500 nm, greater than or equal to about 510 nm, greater than or equal to about 515 nm, greater than or equal to about 520 nm, greater than or equal to about 525 nm, greater than or equal to about 530 nm, or greater than or equal to about 535 nm. A maximum luminescent peak wavelength of the green light may be less than or equal to about 560 nm, less than or equal to about 550 nm, less than or equal to about 545 nm, or less than or equal to about 540 nm.

In the quantum dot or the core, a mole ratio of gallium with respect to a sum of indium and gallium (Ga:(In+Ga)) is less than or equal to about 0.5:1, for example, less than or equal to about 0.4:1, or less than or equal to about 0.3:1. The mole ratio of gallium with respect to a sum of indium and gallium (Ga:(In+Ga)) may be greater than 0, for example, may be greater than or equal to about 0.05:1, greater than or equal to about 0.1:1, or greater than or equal to about 0.15:1.

In an embodiment, the quantum dot may include an alloy core of an indium gallium phosphide represented by $In_{1-x}Ga_xP$, wherein x is greater than 0, greater than or equal to about 0.05, greater than or equal to about 0.1, greater than or equal to about 0.15 and less than or equal to about 0.5, less than or equal to about 0.4, or less than or equal to about 0.35. A dimension (a size) of the semiconductor nanocrystal core may be greater than or equal to about 2 nm, greater than or equal to about 2.2 nm, greater than or equal to about 2.3 nm, greater than or equal to about 2.4 nm, greater than or equal to about 2.5 nm, or greater than or equal to about 2.6 nm. A dimension (a size) of the semiconductor nanocrystal core may be less than or equal to about 4 nm, less than or equal to about 3.9 nm, less than or equal to about 3.8 nm, less than or equal to about 3.7 nm, less than or equal to about 3.6 nm, less than or equal to about 3.5 nm, less than or equal to about 3.4 nm, less than or equal to about 3.3 nm, or less than or equal to about 3.2 nm. As used herein, the term "size" may refer to a size of a single quantum dot or an average size of a plurality of quantum dots. A size of the quantum dot may be a diameter of a particle (or in case of a non-spherical particle, an equivalent size determined by an electron microscopy analysis). A size of the quantum dot may be determined by an appropriate analysis tool such as a (transmission) electron microscopy analysis.

The quantum dot of an embodiment may exhibit improved absorption rate together with a minimized increase of weight and thus a quantum dot polymer composite (or a pattern thereof) may exhibit a desired level of a blue light absorption rate.

Gallium phosphide (GaP) may have the same crystal structure and the same anion as indium phosphide (InP) while it has a bandgap energy greater than that of the InP. A bandgap energy of an indium gallium phosphide alloy may increase as an amount of the gallium increases (see FIG. 1).

Figure 2A:
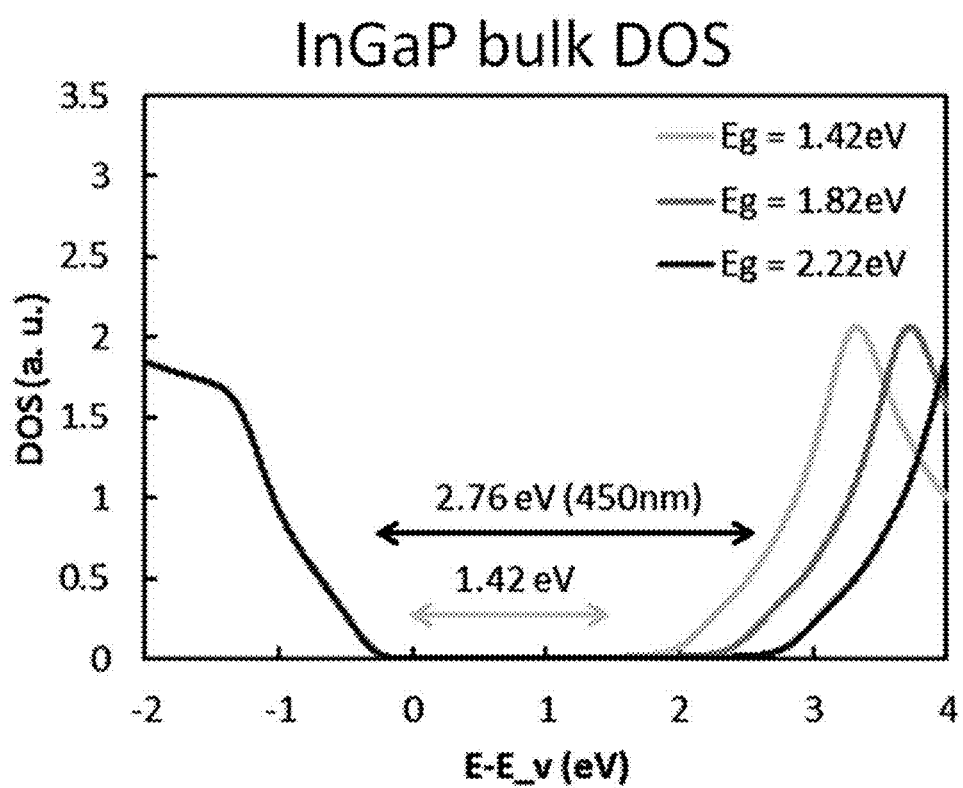
FIG. 2A is a graph of a density of state (DOS (arbitrary units (a. u.)) versus a bandgap energy (E-E_v (eV)) in three $In_{1-x}Ga_xP$ bulk materials, wherein x is greater than or equal to 0. The curve bandgap energy (Eg)=1.42 eV is for a bulk material having a Ga mole fraction of zero (0), the curve Eg=1.82 eV is for a bulk material having a Ga mole fraction of 0.43, and the curve Eg=2.22 eV is for a bulk material having a Ga mole fraction of 0.87).
Figure 2C:
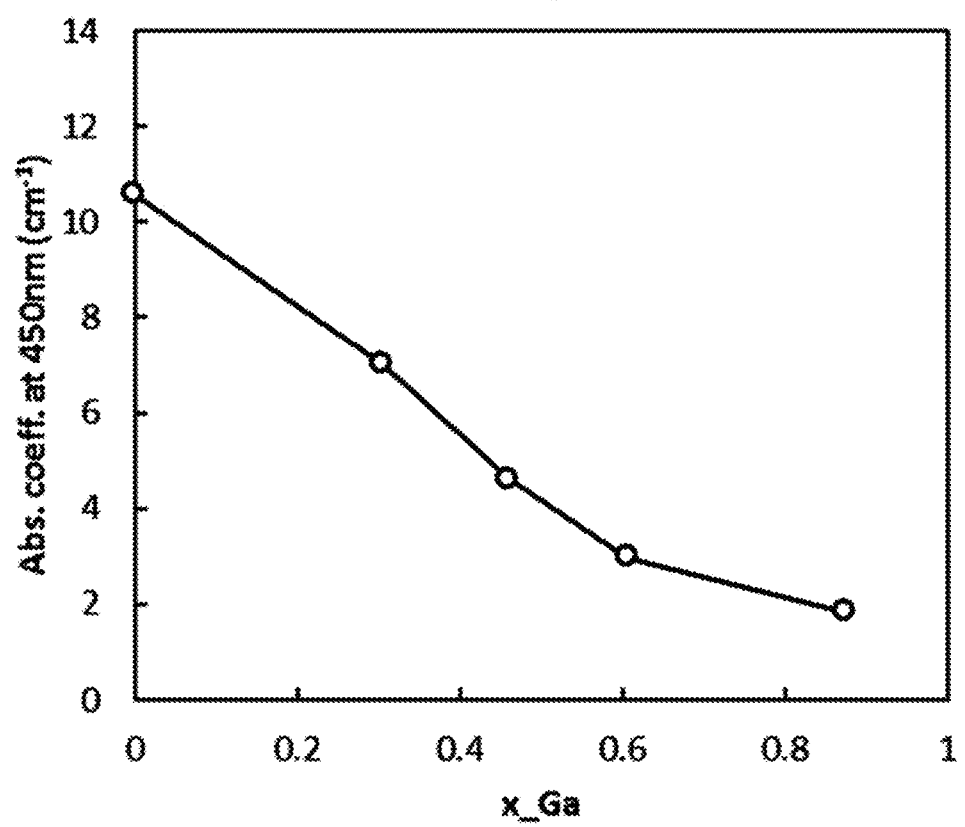
FIG. 2C is a graph of absorption coefficient at a wavelength of 450 nm ($cm^{-1}$) versus gallium mole fraction (x_Ga) in the $In_{1-x}Ga_xP$ bulk material, wherein x is greater than or equal to 0.

However, for a bulk material, as a gallium mole fraction increases in an indium gallium phosphide alloy, density of state (DOS) is also shifted and thereby a resulting material exhibits a decreased absorption coefficient particularly with respect to blue light at a wavelength of about 450 nm (see FIG. 2A, FIG. 2B, and FIG. 2C). With reference to FIG. 2A and FIG. 2B, the curve of Eg=1.42 eV is for a bulk material having a gallium mole fraction of zero (0) (i.e., InP), the curve of Eg=1.82 eV is for a bulk material having a gallium mole fraction of 0.43 (i.e., $In_{0.57}Ga_{0.43}P$), and the curve of Eg=2.22 eV is for a bulk material having a gallium mole fraction of 0.87 (i.e., $In_{0.13}Ga_{0.87}P$). Therefore, for a bulk material, the indium gallium phosphide alloy may exhibit a minimal increase in a blue light absorption rate (for example, for blue light at a wavelength of about 450 nm).

Surprisingly, however, the present inventors have found that the quantum dots having the aforementioned structure may exhibit improved blue light absorption rate in a form of a color filter (e.g., in a form of a patterned quantum dot polymer composite).

Referring to FIG. 1, an alloy core of the InP and the GaP may have a widened band gap, and according to the effective mass approximation (EMA), the quantum dot of an embodiment may have an increased volume for emitting light (e.g., green light) of a desired wavelength, and the increased volume of the core may result in an increase in the number of electrons participating absorption, whereby a single particle including the core may exhibit increased absorption coefficient. Without wishing to be bound by any theory, in a quantum dot of a core-shell structure, the core is where excitons are gathered together and unlike the shell, a slight increase of the core volume may result in a sharp increase in an absorption rate, while the same slight volume increase of the core may have a relatively limited effect on a weight increase thereof.

Figure 3A:
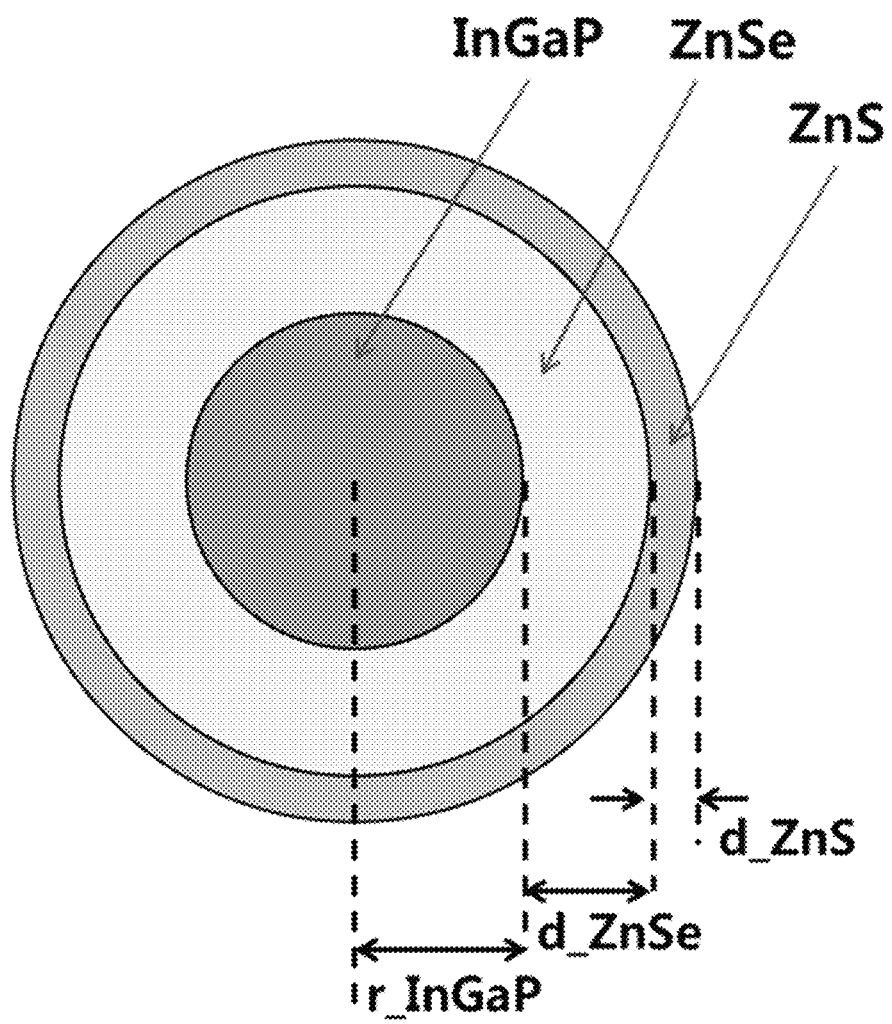
FIG. 3A is a schematic cross-sectional illustration of the quantum dot of an embodiment.
Figure 3B:
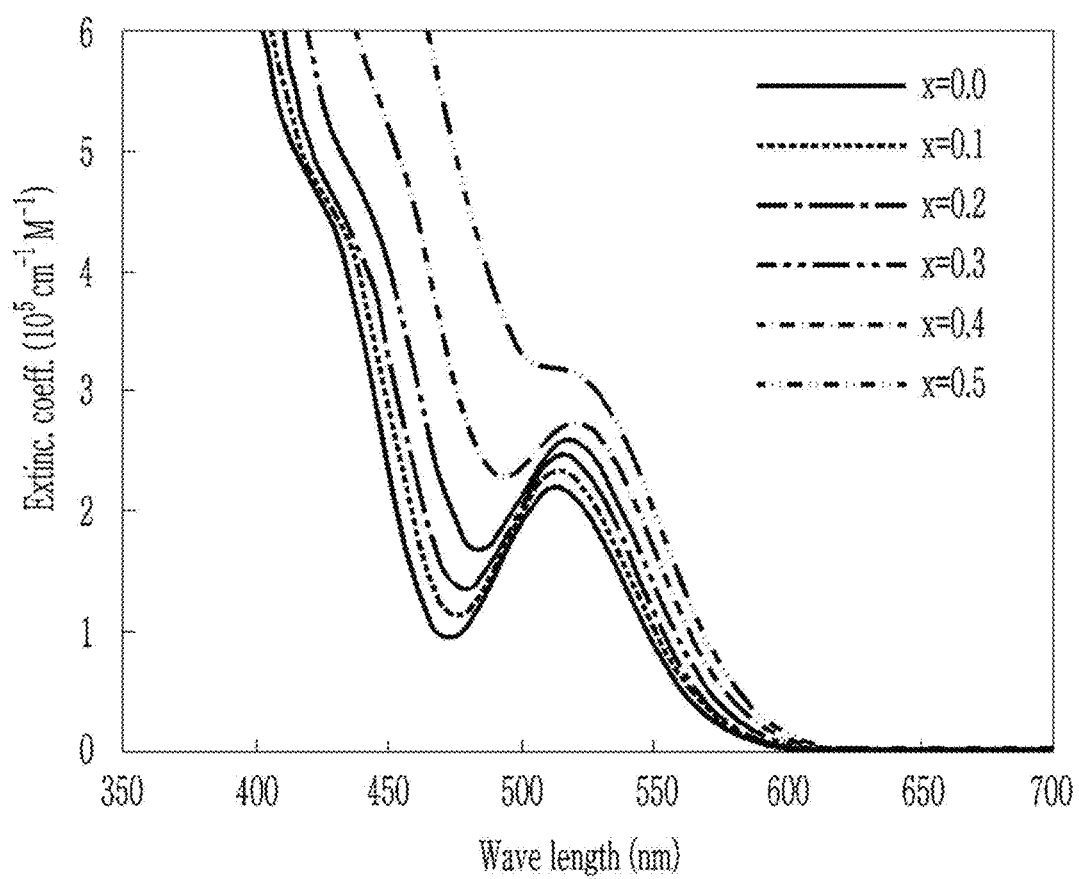
FIG. 3B is a graph of extinction coefficient (Extinc. coeff. (inverse centimeters, inverse molar ($cm^{-1}M^{-1}$))) versus wavelength (nm) of absorption light for a single quantum dot having a cross-section illustrated in FIG. 3A, having a predetermined gallium mole fraction (x) in the InGaP core, and emitting light of a wavelength of 540 nm.

Therefore, as shown in FIG. 3A, a calculation according to the effective mass approximation (EMA) with respect to a quantum dot having a structure of InGaP core/a ZnSe shell (of a predetermined thickness of, for example, about 1.32 nm)/a ZnS shell (of a predetermined thickness of, for example, about 0.63 nm) can be made under an assumption that a luminescent wavelength of the quantum dot is about 540 nm, and a UV-Vis absorption spectrum of the quantum dot can be plotted with varying gallium mole fraction (x) as shown in FIG. 3B. Regarding the quantum dot having a cross section illustrated in FIG. 3A, changes in first and second absorption peaks versus gallium fraction (x_Ga) is calculated from an effective mass approximation under a condition that emitting light is maintained at a wavelength of about 540 nm. From the results, it is believed that as the gallium mole fraction increases, the second absorption peak (i.e., the peak in the range of about 430 nm for x=0.0) is shifted toward the first absorption peak and the absorption for the blue light having a wavelength of about 450 nm may be enhanced.

Figure 3D:
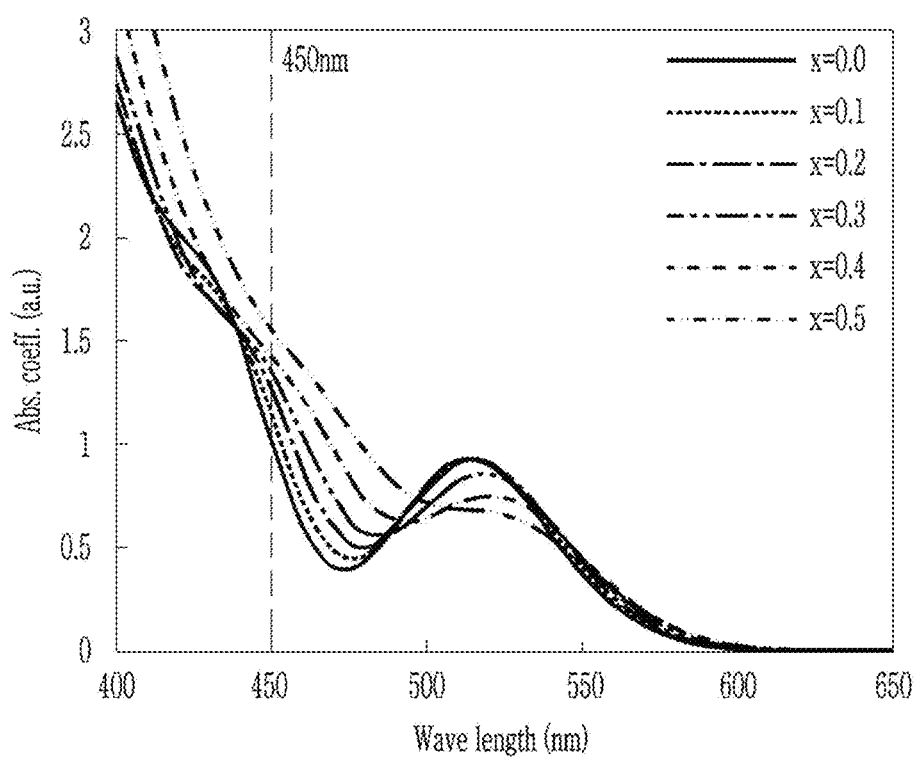
FIG. 3D is a graph of absorption coefficient (Abs. coeff. (a.u.)) versus wavelength (nm) showing UV-Vis absorption spectra of quantum dot polymer composites including a given number of quantum dots. The graph is obtained by simulation taking into consideration both of the extinction coefficient versus the wavelength of excitation light for a single quantum dot having a predetermined gallium mole fraction as illustrated in FIG. 3B and the number density of the quantum dots included in the composite versus the gallium mole fraction.

FIG. 3D illustrates a UV-Vis absorption curve of a composite (e.g., a color filter) including the quantum dots having a structure shown in FIG. 3A, obtained by taking into consideration both the number density of the quantum dots and the changes of the UV Vis absorption spectrum of FIG. 3B.

As explained above, the present inventors have found that as the gallium mole fraction (x) increases, the core volume for light emission of a desired wavelength may be also increased, which may lead to an increase of the single quantum dot and whereby the number density of the quantum dots in a given weight may be decreased. As can be seen in FIG. 3C, the present inventors also have found that a number density of the InGaP/ZnSe/ZnS quantum dots with respect to a number density of the InP/ZnSe/ZnS quantum dots may decrease as the gallium mole fraction (x) increases. Thus, the present inventors have found that the increase of the gallium mole fraction in the InGaP alloy core may have the effect of increasing the absorption of the single quantum dot and the effect of decreasing the number density of the quantum dots that can be included in a given weight of the composite.

However, the present inventors have found that taking into consideration both the effects, the effects of increasing the absorption coefficient may have a greater effect. In an embodiment, when the gallium substitution rate (x) is 0.2, the $In_{0.8}Ga_{0.2}P$ core may exhibit an absorption coefficient of a single quantum dot that is 1.4 times greater than the core having the x=0. However, in terms of the core size enabling emission of light of a wavelength of about 540 nm, 2.1 nm of the quantum dots having x=0 may be increased to 2.4 nm thereof, whereby the number density of the quantum dots in the composite may exhibit a 0.88 times decrease. Therefore, the present inventors have found that an absorption coefficient of a quantum dot-polymer composite including the quantum dots may be enhanced by 1.24 times, and thus when a quantum dot-polymer composite including the quantum dots having no gallium has a light absorption of about 87%, a quantum dot-polymer composite including the quantum dots of the embodiment may exhibit an increased light absorption for example up to about 92%. In sum, the quantum dot polymer composite (or a quantum dot (QD) color filter) including the quantum dots of the embodiment may exhibit an increased absorption rate in comparison with the quantum dots having the InP core with no gallium and the same shell composition.

The quantum dot of the embodiment has a core-multishell structure wherein a first semiconductor nanocrystal shell including zinc and selenium is disposed on (e.g., directly on) the aforementioned semiconductor nanocrystal core and, a second semiconductor nanocrystal shell including zinc and sulfur is disposed on (e.g., directly on) the first semiconductor nanocrystal shell.

The first semiconductor nanocrystal shell may include a zinc selenide or ZnSe. The first semiconductor nanocrystal shell may not include sulfur. In an embodiment, the first semiconductor nanocrystal shell may not include ZnSeS. The first semiconductor nanocrystal shell may consist of ZnSe. The first semiconductor nanocrystal shell may be disposed directly on the semiconductor nanocrystal core.

In an embodiment, a thickness of the first semiconductor nanocrystal shell may be at least 3 monolayers (ML), for example, greater than or equal to about 3.5 ML, greater than or equal to about 3.6 ML, greater than or equal to about 3.7 ML, greater than or equal to about 3.8 ML, greater than or equal to about 3.9 ML, or greater than or equal to about 4 ML. A thickness of the first semiconductor nanocrystal shell may be less than or equal to about 7 ML, for example, less than or equal to about 6 ML, or less than or equal to about 5 ML. In an embodiment, a thickness of the first semiconductor nanocrystal shell may be greater than or equal to about 0.9 nm, greater than or equal to about 1 nm, greater than or equal to about 1.1 nm, greater than or equal to about 1.2 nm, greater than or equal to about 1.3 nm, greater than or equal to about 1.4 nm, greater than or equal to about 1.5 nm, greater than or equal to about 1.6 nm, greater than or equal to about 1.7 nm, greater than or equal to about 1.8 nm, greater than or equal to about 1.9 nm, or greater than or equal to about 2 nm. In an embodiment, a thickness of the first semiconductor nanocrystal shell may be less than or equal to about 2.5 nm, less than or equal to about 2.4 nm, less than or equal to about 2.3 nm, less than or equal to about 2.2 nm, less than or equal to about 2.1 nm, less than or equal to about 2 nm, less than or equal to about 1.9 nm, less than or equal to about 1.8 nm, less than or equal to about 1.7 nm, less than or equal to about 1.6 nm, less than or equal to about 1.5 nm, less than or equal to about 1.4 nm, less than or equal to about 1.3 nm, or less than or equal to about 1.25 nm.

In an embodiment, the second semiconductor nanocrystal shell may include a zinc sulfide or ZnS. In an embodiment, the second semiconductor nanocrystal shell may not include selenium. In an embodiment, the second semiconductor nanocrystal shell may be disposed directly on the first semiconductor nanocrystal shell. In an embodiment, the second semiconductor nanocrystal shell may be an outermost layer of the quantum dot. In an embodiment, a thickness of the second semiconductor nanocrystal shell may be greater than or equal to about 0.15 nm, greater than or equal to about 0.16 nm, greater than or equal to about 0.17 nm, greater than or equal to about 0.18 nm, greater than or equal to about 0.19 nm, or greater than or equal to about 0.2 nm. In an embodiment, a thickness of the second semiconductor nanocrystal shell may be less than or equal to about 0.7 nm, less than or equal to about 0.65 nm, less than or equal to about 0.5 nm, less than or equal to about 0.45 nm, or less than or equal to about 0.4 nm.

In a quantum dot of an embodiment having the aforementioned structure, a mole ratio of sulfur with respect to selenium may be less than or equal to about 2.5:1, and the quantum dot may exhibit an increased light absorption rate together with improved luminous properties. In a quantum dot of an embodiment, a mole ratio of sulfur with respect to selenium may be less than or equal to about 2.4:1, less than or equal to about 2.3:1, less than or equal to about 2.2:1, less than or equal to about 2.1:1, less than or equal to about 2.0:1, less than or equal to about 1.9:1, less than or equal to about 1.8:1, less than or equal to about 1.7:1, less than or equal to about 1.6:1, less than or equal to about 1.5:1, less than or equal to about 1.4:1, less than or equal to about 1.3:1, less than or equal to about 1.2:1, less than or equal to about 1.1:1, less than or equal to about 1:1, less than or equal to about 0.9:1, or less than or equal to about 0.8:1, less than or equal to about 0.7:1, less than or equal to about 0.6:1, less than or equal to about 0.5, or less than or equal to about 0.4. In a quantum dot of an embodiment, a mole ratio of sulfur with respect to selenium may be greater than or equal to about 0.05:1, greater than or equal to about 0.07:1, greater than or equal to about 0.1:1, greater than or equal to about 0.2:1, greater than or equal to about 0.3:1, greater than or equal to about 0.4:1, or greater than or equal to about 0.5:1.

In the quantum dots, a mole ratio of zinc with respect to a sum of indium and gallium (Zn:(In+Ga)) may be less than or equal to about 45:1, less than or equal to about 30:1, less than or equal to about 29:1, less than or equal to about 28:1, less than or equal to about 27:1, less than or equal to about 26:1, less than or equal to about 25:1, or less than or equal to about 24:1. In the quantum dots, a mole ratio of zinc with respect to a sum of indium and gallium (Zn:(In+Ga)) may be greater than or equal to about 10:1, greater than or equal to about 11:1, greater than or equal to about 12:1, greater than or equal to about 13:1, greater than or equal to about 14:1, or greater than or equal to about 15:1.

In the quantum dots, a mole ratio of a sum of indium and gallium with respect to a sum of selenium and sulfur ((Ga+In):(S+Se)) may be greater than or equal to about 0.03:1, greater than or equal to about 0.04:1, greater than or equal to about 0.05:1, greater than or equal to about 0.07:1, greater than or equal to about 0.09:1, or greater than or equal to about 0.1:1. In the quantum dots, a mole ratio of a sum of indium and gallium with respect to a sum of selenium and sulfur ((Ga+In):(S+Se)) may be less than or equal to about 0.2:1, less than or equal to about 0.15:1, less than or equal to about 0.1:1, less than or equal to about 0.09:1, less than or equal to about 0.08:1, or less than or equal to about 0.07:1.

The present inventors have found that the adoption of the aforementioned shell(s) together with the aforementioned core may makes it possible for the quantum dot of an embodiment to provide a quantum dot-polymer composite having enhanced excitation light absorbance and increased luminous efficiency. For example, in the quantum dot of an embodiment, the thickness of the first semiconductor nanocrystal shell (e.g., based on the zinc selenide) within the aforementioned range may have a favorable effect on the increase of the luminous efficiency of the quantum dot. The thickness of the second semiconductor nanocrystal shell (e.g., based on the zinc sulfide) within the aforementioned range can make it possible, for example, for a quantum dot-polymer composite film including the quantum dot to maintain an excitation light (e.g., a blue light) absorbance at an enhanced, e.g., improved, level without adversely affecting the luminous efficiency thereof.

The quantum dots of an embodiment may include the shell of the aforementioned structure and composition and may exhibit a high level of chemical stability. As a result, even when the quantum dots of an embodiment undergo a preparation process for a composition including the quantum dots (that may involve contact with various chemicals such as an organic polymer, an organic solvent, and various additives) or a production process for a composite (or a pattern thereof) using the composition, the resulting composition or the resulting composite may exhibit an increased luminous properties.

Accordingly, a quantum dot of an embodiment may have a quantum efficiency of greater than or equal to about 65%, for example, greater than or equal to about 66%, greater than or equal to about 67%, greater than or equal to about 68%, greater than or equal to about 69%, or greater than or equal to about 70%. In an embodiment, "quantum yield (or quantum efficiency)" is a ratio of photons emitted to photons absorbed, e.g., by a nanostructure or population of nanostructures. In an embodiment, the quantum efficiency may be determined by any method. For example, there may be two methods for measuring the fluorescence quantum yield or efficiency: the absolute method and the relative method. The absolute method directly obtains the quantum yield by detecting all sample fluorescence through the use of an integrating sphere. The relative method compares the fluorescence intensity of a standard sample with the fluorescence intensity of an unknown sample to calculate the quantum yield of the unknown sample. The QY may be readily determined by using commercially available equipment.

The light absorbance at about 350 nm for the quantum dot may reflect absorption of the first semiconductor nanocrystal shell (e.g., ZnSe) and the second semiconductor nanocrystal shell (e.g., ZnS) for example, which may depend on a size thereof. The light absorbance at about 450 nm may represent absorption of blue light, e.g., from a blue light source, that is provided with a device including a quantum dot based color filter. In the UV-Vis absorption spectrum of the quantum dot, a ratio of light absorbance at 450 nm with respect to light absorbance at about 350 nm may represent a blue light source absorption ability of the quantum dot depending on a shell volume of the quantum dot of an embodiment. In case of the quantum dot having the aforementioned shell composition, as the ratio of light absorbance at 450 nm with respect to light absorbance at about 350 nm increases, a film including the quantum dot may exhibit a high level of blue light absorbance.

A quantum dot of an embodiment may have a ratio of absorbance (intensity) at 450 nm with respect to absorbance at 350 nm that is greater than or equal to about 0.08:1 in a UV-Vis absorption spectrum. In an embodiment, in a UV-Vis absorption spectrum, a ratio of absorbance (intensity) at 450 nm with respect to absorbance at 350 nm may be greater than or equal to about 0.08:1, greater than or equal to about 0.09:1, greater than or equal to about 0.1:1, or greater than or equal to about 0.11:1.

In an embodiment, the quantum dot polymer composite may exhibit an absorption rate of greater than or equal to about 89%, for example, greater than or equal to about 90%, greater than or equal to about 91%, greater than or equal to about 92%, or greater than or equal to about 93%, when it is in a form of a film having a thickness of about 6 micrometers (μm) and an amount of the quantum dots included therein is less than or equal to about 45 wt % based on a total weight of the composite.

In the UV-Vis absorption spectrum of the quantum dot, the first absorption peak wavelength may be greater than or equal to about 450 nm and less than or equal to about the maximum photoluminescent peak wavelength of the quantum dot. In case of the green light emitting quantum dot, the first absorption peak wavelength may be for example, greater than or equal to about 480 nm, greater than or equal to about 485 nm, greater than or equal to about 490 nm, or greater than or equal to about 495 nm and less than or equal to about 520 nm, less than or equal to about 515 nm, less than or equal to about 510 nm, or less than or equal to about 505 nm.

In an embodiment, a size (or an average size, hereinafter referred to as a size) of the quantum dot may be greater than or equal to about 5 nm, greater than or equal to about 5.5 nm, greater than or equal to about 6 nm, greater than or equal to about 6.5 nm, or greater than or equal to about 7 nm. In an embodiment, a size (or an average size) of the quantum dot may less than or equal to about 10 nm, less than or equal to about 9 nm, less than or equal to about 8 nm, less than or equal to about 7 nm, less than or equal to about 6.5 nm, or less than or equal to about 6 nm.

In the case of a spherically shaped particle, the size of the quantum dot may be a particle diameter, or in the case of a non-spherically shaped particle, the size of the quantum dot may be calculated by converting a (e.g., two-dimensional) area of an electron microscopic image of the particle into a circle (e.g., an equivalent circle area).

A shape of the quantum dot is not particularly limited, may for example be a spherical, polyhedron, pyramid, multipod, cubic shape, nanotube, nanowire, nanofiber, nanosheet, or a combination thereof, but is not limited thereto.

The quantum dot may include the organic ligand, the organic solvent, or a combination thereof, which will be described below, on a surface of the quantum dot. The organic ligand, the organic solvent, or a combination thereof may be bound to a surface of the quantum dot.

In an embodiment, a method of producing the aforementioned quantum dot includes: obtaining a first mixture including a first shell precursor containing zinc, an organic ligand, and an organic solvent; optionally heating the first mixture; injecting a semiconductor nanocrystal core including indium, gallium, and phosphorous having the aforementioned composition, and optionally not being heated, and a selenium containing precursor to the (optionally heated) first mixture to obtain a second mixture;

heating the second mixture at a first reaction temperature and keeping the same at the first reaction temperature for period of time, at least about 40 minutes, for example, or at least about 50 minutes, for example, to obtain a third mixture including a particle including a first semiconductor nanocrystal shell including zinc and selenium formed on the semiconductor nanocrystal core; and injecting a sulfur containing precursor (e.g., a stock solution including the sulfur containing precursor) into the third mixture at the first reaction temperature and carrying out a reaction to form a second semiconductor nanocrystal shell on the first semiconductor nanocrystal shell, wherein an amount of the selenium containing precursor and an amount of the sulfur containing precursor with respect to the core in the second mixture and the third mixture are controlled respectively (and optionally controlling a duration of a reaction in each step) in order for a resulting quantum dot to satisfy the aforementioned shell composition.

Details of the quantum dot are the same as set forth above.

The organic ligand may include RCOOH, $RNH_2$, $R_2NH$, $R_3N$, RSH, $RH_2PO$, $R_2HPO$, $R_3PO$, $RH_2P$, $R_2HP$, $R_3P$, ROH, RCOOR', $RPO(OH)_2$, RHPOOH, $R_2POOH$ (wherein R and R' are the same or different, and are independently a substituted or unsubstituted C1 to C40 (or C3 to C24) aliphatic hydrocarbon group (e.g., an alkyl group, an alkenyl group, or an alkynyl group), a substituted or unsubstituted C6 to C40 aromatic hydrocarbon group (such as a C6 to C20 aryl group), a polymeric organic ligand, or a combination thereof.

The organic ligand may coordinate to, e.g., be bound to, the surface of the obtained nanocrystal and help the nanocrystal to be well dispersed in the solution, may affect light emitting characteristics of quantum dots, electrical characteristics of quantum dots, or a combination thereof.

Examples of the organic ligand may include methane thiol, ethane thiol, propane thiol, butane thiol, pentane thiol, hexane thiol, octane thiol, dodecane thiol, hexadecane thiol, octadecane thiol, or benzyl thiol; methyl amine, ethyl amine, propyl amine, butyl amine, pentyl amine, hexyl amine, octyl amine, dodecyl amine, hexadecyl amine, octadecyl amine, dimethyl amine, diethyl amine, dipropyl amine; methanoic acid, ethanoic acid, propanoic acid, butanoic acid, pentanoic acid, hexanoic acid, heptanoic acid, octanoic acid, dodecanoic acid, hexadecanoic acid, octadecanoic acid, oleic acid, or benzoic acid; a phosphine such as a substituted or unsubstituted methyl phosphine (e.g., trimethyl phosphine, methyldiphenyl phosphine, etc.), a substituted or unsubstituted ethyl phosphine (e.g., triethyl phosphine, ethyldiphenyl phosphine, etc.), a substituted or unsubstituted propyl phosphine, a substituted or unsubstituted butyl phosphine, a substituted or unsubstituted pentyl phosphine, or a substituted or unsubstituted octylphosphine (e.g., trioctylphosphine (TOP)); a phosphine oxide such as a substituted or unsubstituted methyl phosphine oxide (e.g., trimethyl phosphine oxide, methyldiphenyl phosphine oxide, etc.), a substituted or unsubstituted ethyl phosphine oxide (e.g., triethyl phosphine oxide, ethyldiphenyl phosphine oxide, etc.), a substituted or unsubstituted propyl phosphine oxide, a substituted or unsubstituted butyl phosphine oxide, or a substituted or unsubstituted octyl phosphine oxide (e.g., trioctylphosphine oxide (TOPO)); diphenyl phosphine, triphenyl phosphine, diphenyl phosphine oxide, or triphenyl phosphine oxide; an alkylphosphinic acid for example, a C5 to C20 alkyl phosphinic acid (e.g., hexyl phosphinic acid, octyl phosphinic acid, dodecanyl phosphinic acid, tetradecanyl phosphinic acid, hexadecanyl phosphinic acid, octadecanyl phosphinic acid, or the like), an alkylphosphonic acid such as a C5 to C20 alkylphosphonic acid; or the like), but are not limited thereto. Two or more different organic ligands may be used.

The organic solvent may be a C6 to C22 primary amine such as hexadecylamine; a C6 to C22 secondary amine such as dioctylamine; a C6 to C40 tertiary amine such as trioctylamine; a nitrogen-containing heterocyclic compound such as pyridine; a C6 to C40 aliphatic hydrocarbon (e.g., alkane, alkene, alkyne, etc.) such as hexadecane, octadecane, octadecene, or squalane; a C6 to C30 aromatic hydrocarbon such as phenyldodecane, phenyltetradecane, or phenyl hexadecane; a phosphine substituted with a C6 to C22 alkyl group such as trioctylphosphine; a phosphine oxide substituted with a C6 to C22 alkyl group such as trioctylphosphine oxide; a C12 to C22 aromatic ether such as phenyl ether, or benzyl ether, or a combination thereof.

Types and amounts of the organic solvent may be appropriately selected taking into consideration precursors and organic ligands.

The first mixture may be heated to a predetermined temperature (e.g., of greater than or equal to about 100° C., for example, greater than or equal to about 120° C., greater than or equal to about 150° C., greater than or equal to about 200° C., greater than or equal to about 250° C., or greater than or equal to about 270° C. and less than or equal to about the first reaction temperature under vacuum, an inert atmosphere, or a combination thereof.

Details of the semiconductor nanocrystal core including indium, gallium, and phosphorous are the same as set forth above. In an embodiment, the core may be synthesized in a hot injection manner wherein a solution including a metal containing precursor (e.g., an indium containing precursor and a gallium containing precursor) and an organic ligand is heated at a high temperature (e.g., of greater than or equal to about 200° C., greater than or equal to about 230° C., greater than or equal to about 250° C., or greater than or equal to about 280° C.) and then a phosphorous containing precursor is injected the heated hot solution. A reaction medium for the core synthesis may not include a zinc containing precursor.

Types of the indium containing precursor may include an indium nitrate, an indium hydroxide, an indium fluoride, an indium chloride, an indium bromide, an indium iodide, an indium oxide, an indium sulfate, an indium carboxylate, an indium acetylacetonate, or a combination thereof.

Types of a gallium containing precursor may include a gallium acetylacetonate, a gallium fluoride, a gallium chloride, a gallium bromide, a gallium iodide, a gallium oxide, a gallium nitrate, a gallium sulfate, a gallium carboxylate, or a combination thereof.

The first shell precursor (e.g., a zinc containing precursor) is not particularly limited and may be selected appropriately. In an embodiment, the zinc precursor may include a Zn metal powder, an alkylated Zn compound (e.g., dimethyl zinc, diethyl zinc, or a combination thereof), a Zn alkoxide, a Zn carboxylate (e.g., zinc acetate), a zinc carbonate, a Zn nitrate, a Zn perchlorate, a Zn sulfate, a Zn acetylacetonate, a Zn halide (e.g., zinc chloride, zinc bromide, zinc iodide, zinc fluoride, or a combination thereof), a Zn carbonate, a Zn cyanide, a Zn hydroxide, a Zn oxide, a Zn peroxide, or a combination thereof. Examples of the first shell precursor may include, but are not limited to dimethyl zinc, diethyl zinc, zinc acetate, zinc acetylacetonate, zinc iodide, zinc bromide, zinc chloride, zinc fluoride, zinc carbonate, zinc cyanide, zinc nitrate, zinc oxide, zinc peroxide, zinc perchlorate, zinc sulfate, and the like. Two or more different zinc containing precursor may be used.

The selenium precursor is not particularly limited and may be desirably selected. In an embodiment, the selenium precursor includes selenium-trioctyl phosphine (Se-TOP), selenium-tributyl phosphine (Se-TBP), selenium-triphenyl phosphine (Se-TPP), tellurium-tributylphosphine (Te-TBP), or a combination thereof but is not limited thereto.

Types of the sulfur containing precursor are not particularly limited and may be selected appropriately. The sulfur containing precursor may include hexane thiol, octane thiol, decane thiol, dodecane thiol, hexadecane thiol, mercapto propyl silane, sulfur-trioctylphosphine (S-TOP), sulfur-tributylphosphine (S-TBP), sulfur-triphenylphosphine (S-TPP), sulfur-trioctylamine (S-TOA), bis(trimethylsilylmethyl) sulfide, sulfide ammonium, sodium sulfide, or a combination thereof. The sulfur containing precursor may be injected at least one time (e.g., at least two times).

The first reaction temperature may be selected appropriately and, for example, may be greater than or equal to about 280° C., greater than or equal to about 290° C., greater than or equal to about 300° C., greater than or equal to about 310° C., or greater than or equal to about 315° C. and less than or equal to about 390° C., less than or equal to about 380° C., less than or equal to about 370° C., less than or equal to about 360° C., less than or equal to about 350° C., less than or equal to about 340° C., or less than or equal to about 330° C.

After or during the heating of the second mixture to the first reaction temperature, a selenium containing precursor may be injected at least one time (e.g., at least twice, at least three times, at least four times, at least five times). The reaction time (keeping the second mixture at the first reaction temperature) may be greater than or equal to about 40 minutes, for example, greater than or equal to about 50 minutes, greater than or equal to about 60 minutes, greater than or equal to about 70 minutes, greater than or equal to about 80 minutes, greater than or equal to about 90 minutes, and less than or equal to about 4 hours, for example, less than or equal to about 3 hours, less than or equal to about 2 hours to form a third mixture including a particle having the first semiconductor nanocrystal shell including zinc and selenium disposed on the semiconductor nanocrystal core.

By keeping the second mixture at the first reaction temperature for the aforementioned time period, the first semiconductor nanocrystal shell including the zinc and the selenium and having a thickness of greater than or equal to about 3 ML may be formed to provide the third mixture. In this case, in the second mixture, the amount of the selenium precursor with respect to the indium may be controlled such that during the predetermined reaction time, the first semiconductor nanocrystal shell having the predetermined thickness may be formed. In an embodiment, the amount of the selenium per one mole of indium may be greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles. In an embodiment, the amount of the selenium per one mole of indium may be less than or equal to about 20 moles, less than or equal to about 18 moles, or less than or equal to about 15 moles.

The third mixture may not include the selenium containing precursor.

At the first reaction temperature, a stock solution including a sulfur containing precursor is added to the third mixture to form a second semiconductor nanocrystal shell on the first semiconductor nanocrystal shell. In an embodiment, the method does not include lowering a temperature of the third mixture down at or below about 100° C., for example, less than or equal to about 50° C. (e.g., 30° C. or lower, or room temperature).

The duration for the formation of the second semiconductor nanocrystal shell may be greater than or equal to about 5 minutes, greater than or equal to about 10 minutes, greater than or equal to about 15 minutes, greater than or equal to about 20 minutes, or greater than or equal to about 25 minutes and less than or equal to about 1 hour, less than or equal to about 50 minutes, less than or equal to about 45 minutes, or less than or equal to about 40 minutes.

In an embodiment, an amount of sulfur with respect to one mole of a sum of indium and gallium in the third mixture may be controlled to obtain a desired shell composition (for example, such that the thickness thereof is less than or equal to about 0.7 nm) taking into consideration the reactivity of the precursor and the reaction temperature. For example, the amount of sulfur with respect to one mole of a sum of indium and gallium in the third mixture may be greater than or equal to about 2 moles, greater than or equal to about 3 moles, greater than or equal to about 4 moles, greater than or equal to about 5 moles, greater than or equal to about 6 moles, greater than or equal to about 7 moles, greater than or equal to about 8 moles, greater than or equal to about 9 moles, or greater than or equal to about 10 moles. The amount of sulfur with respect to one mole of a sum of indium and gallium in the third mixture may be, less than or equal to about 45 moles, less than or equal to about 40 moles, less than or equal to about 35 moles, less than or equal to about 30 moles, less than or equal to about 25 moles, less than or equal to about 20 moles, less than or equal to about 19 moles, less than or equal to about 18 moles, less than or equal to about 17 moles, less than or equal to about 16 moles, less than or equal to about 15 moles, less than or equal to about 14 moles, less than or equal to about 13 moles, less than or equal to about 12 moles, less than or equal to about 11 moles, less than or equal to about 10 moles, less than or equal to about 9 moles, less than or equal to about 8 moles, less than or equal to about 7 moles, less than or equal to about 6 moles, or less than or equal to about 5 moles.

After the reaction, a non-solvent is added into the obtained final reaction solution, and thereby organic ligand-coordinated quantum dots may be separated (e.g., precipitated). The non-solvent may be a polar solvent that is miscible with the organic solvent used in the reaction and nanocrystals are not dispersible therein. The non-solvent may be selected depending on the organic solvent used in the reaction and may be for example, acetone, ethanol, butanol, isopropanol, ethanediol, water, tetrahydrofuran (THF), dimethyl sulfoxide (DMSO), diethyl ether, formaldehyde, acetaldehyde, a solvent having a similar solubility parameter to the foregoing solvents, or a combination thereof. The separation may be performed through a centrifugation, precipitation, chromatography, or distillation. The separated nanocrystal may be added to a washing solvent and washed, if desired. The washing solvent is not particularly limited and may include a solvent having a similar solubility parameter to a solubility parameter of the organic ligand and may, for example, include hexane, heptane, octane, chloroform, toluene, benzene, and the like.

The quantum dots may be dispersed in a dispersing solvent. The quantum dots may form an organic solvent dispersion. The organic solvent dispersion may be free of water, may be free of a water miscible organic solvent, or a combination thereof. The dispersing solvent may be selected appropriately. The dispersing solvent may include (or consists of) the aforementioned organic solvent. The dispersing solvent may include (or consists of) a substituted or unsubstituted C1 to C40 aliphatic hydrocarbon, a substituted or unsubstituted C6 to C40 aromatic hydrocarbon, or a combination thereof.

In an embodiment, a composition includes: (for example, a plurality of) the aforementioned quantum dot(s); a dispersing agent (that may disperse the quantum dots and optionally may include a carboxylic acid group containing a binder polymer); and an organic solvent (or a liquid vehicle or an organic solvent and a liquid vehicle). The composition may further include a polymerizable (e.g., photopolymerizable) monomer including a carbon-carbon double bond; and optionally an initiator (e.g., a photoinitiator or a thermal initiator). The composition may be photosensitive.

In the composition, details for the quantum dots are the same as set forth above. In the composition, the amount of the quantum dot may be selected appropriately taking into consideration the types and amounts of other components in the composition and a final use thereof (e.g., a color filter). In an embodiment, the amount of the quantum dot may be greater than or equal to about 1 weight percent (wt %), for example, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, greater than or equal to about 10 wt %, greater than or equal to about 15 wt %, greater than or equal to about 20 wt %, greater than or equal to about 25 wt %, greater than or equal to about 30 wt %, greater than or equal to about 35 wt %, or greater than or equal to about 40 wt %, based on a total solid content of the composition. The amount of the quantum dot may be less than or equal to about 70 wt %, for example, less than or equal to about 65 wt %, less than or equal to about 60 wt %, less than or equal to about 55 wt %, or less than or equal to about 50 wt %, based on a total solid content of the composition. A weight percent of a component, based on a total solid content of the composition, may represent the amount of the component in the composite, which will be described below.

The composition of an embodiment may be used for providing a pattern including a quantum dot-polymer composite. In an embodiment, the composition may be a photoresist composition that may be applicable to a photolithography process. In an embodiment, the composition may be an ink composition that may be applicable to an ink jet process (e.g., a liquid drop discharging method such as an ink jet printing). In an embodiment, the composition may not include a conjugated polymer (except for a cardo binder that will be described below). In an embodiment, the composition may include a conjugated (or electrically conductive) polymer. As used herein, the conjugated polymer may be a polymer including a conjugated double bond such as a polyphenylene vinylene.

In the composition of an embodiment, a dispersing agent is a compound capable of securing, e.g., improving, a dispersibility of the quantum dots. The dispersing agent may be a binder polymer. The binder polymer may include a carboxylic acid group (for example, in repeating units of the binder polymer). The binder polymer may be an (electrically) insulative polymer.

In an embodiment, the binder polymer may include:

a copolymer of a monomer combination including a first monomer, a second monomer, and optionally a third monomer, the first monomer including a carboxylic acid group and a carbon-carbon double bond, the second monomer including a carbon-carbon double bond and a hydrophobic moiety and not including a carboxylic acid group, and the third monomer including a carbon-carbon double bond and a hydrophilic moiety and not including a carboxylic acid group;

a multi-aromatic ring-containing polymer including a carboxylic acid group (—COOH) and including a backbone structure in a main chain (e.g., a backbone structure incorporated in the main chain), wherein the backbone structure includes a cyclic group including a quaternary carbon atom and two aromatic rings bound to the quaternary carbon atom (e.g., also known as a cardo binder);

or a combination thereof.

The copolymer may include a first repeating unit derived from the first monomer, a second repeating unit derived from the second monomer, and optionally a third repeating unit derived from the third monomer.

Examples of the first monomer may include, but are not limited to, acrylic acid, methacrylic acid, maleic acid, itaconic acid, fumaric acid, 3-butenoic acid, and other carboxylic acid vinyl ester compounds. The first monomer may include one or more compounds.

Examples of the second monomer may include, but are not limited to:

alkenyl aromatic compounds such as styrene, α-methyl styrene, vinyl toluene, or vinyl benzyl methyl ether;

unsaturated carboxylic acid ester compounds such as methyl acrylate, methyl methacrylate, ethyl acrylate, ethyl methacrylate, butyl acrylate, butyl methacrylate, benzyl acrylate, benzyl methacrylate, cyclohexyl acrylate, cyclohexyl methacrylate, phenyl acrylate, or phenyl methacrylate;

unsaturated carboxylic acid amino alkyl ester compounds such as 2-amino ethyl acrylate, 2-amino ethyl methacrylate, 2-dimethyl amino ethyl acrylate, or 2-dimethyl amino ethyl methacrylate;

maleimides such as N-phenylmaleimide, N-benzylmaleimide, or N-alkylmaleimide;

unsaturated carboxylic acid glycidyl ester compounds such as glycidyl acrylate or glycidyl methacrylate;

vinyl cyanide compounds such as acrylonitrile or methacrylonitrile; and unsaturated amide compounds such as acrylamide or methacrylamide, but are not limited thereto.

As the second monomer, one or more compounds may be used.

If present, examples of the third monomer may include 2-hydroxy ethyl acrylate, 2-hydroxy ethyl methacrylate, hydroxy propyl acrylate, hydroxy propyl methacrylate, 2-hydroxy butyl acrylate, and 2-hydroxy butyl methacrylate, but are not limited thereto. The third monomer may include one or more compounds.

In an embodiment, the binder polymer may include a multi-aromatic ring-containing polymer. The multi-aromatic ring-containing polymer is also known as a cardo binder, which may be commercially available.

The carboxylic acid group-containing binder may have an acid value of greater than or equal to about 50 milligrams of potassium hydroxide per gram (mg KOH/g). For example, the carboxylic acid group-containing binder may have an acid value of greater than or equal to about 60 mg KOH/g, greater than or equal to about 70 mg KOH/g, greater than or equal to about 80 mg KOH/g, greater than or equal to about 90 mg KOH/g, greater than or equal to about 100 mg KOH/g, greater than or equal to about 110 mg KOH/g, greater than or equal to about 120 mg KOH/g, greater than or equal to about 125 mg KOH/g, or greater than or equal to about 130 mg KOH/g, but is not limited thereto. The carboxylic acid group-containing binder may have an acid value of less than or equal to about 250 mg KOH/g, for example, less than or equal to about 240 mg KOH/g, less than or equal to about 230 mg KOH/g, less than or equal to about 220 mg KOH/g, less than or equal to about 210 mg KOH/g, less than or equal to about 200 mg KOH/g, less than or equal to about 190 mg KOH/g, less than or equal to about 180 mg KOH/g, less than or equal to about 170 mg KOH/g, or less than or equal to about 160 mg KOH/g, but is not limited thereto.

The binder polymer (e.g., containing the carboxylic acid group, such as the carboxylic acid group-containing binder) may have a weight (or a number) average molecular weight of greater than or equal to about 1,000 grams per mole (g/mol), for example, greater than or equal to about 2,000 g/mol, greater than or equal to about 3,000 g/mol, or greater than or equal to about 5,000 g/mol. The binder polymer may have a weight (or a number) average molecular weight of less than or equal to about 100,000 g/mol, for example, less than or equal to about 50,000 g/mol, less than or equal to about 25,000 g/mol, or less than or equal to about 10,000 g/mol.

In the composition, an amount of the dispersing agent (e.g., the binder polymer) may be greater than or equal to about 0.5 wt %, for example, greater than or equal to about 1 wt %, greater than or equal to about 5 wt %, greater than or equal to about 10 wt %, greater than or equal to about 15 wt %, or greater than or equal to about 20 wt %, based on a total weight (or a total solid content) of the composition. In an embodiment, an amount of the dispersing agent (or the binder polymer) may less than or equal to about 35 wt %, less than or equal to about 33 wt %, less than or equal to about 30 wt %, less than or equal to about 25 wt %, or less than or equal to about 20 wt %, based on a total weight (or a total solid content) of the composition.

In the composition according to an embodiment, the (photo)polymerizable monomer including at least one (e.g., at least two, at least three, or more) carbon-carbon double bond may include a (e.g., photopolymerizable) (meth)acrylate monomer. The (photo)polymerizable monomer may be a precursor for an insulative polymer. Examples of the (photo)polymerizable monomer may include, but are not limited to, a C1-C10-alkyl (meth)acrylate, ethylene glycol di(meth)acrylate, triethylene glycol di(meth)acrylate, diethylene glycol di(meth)acrylate, 1,4-butanediol di(meth)acrylate, 1,6-hexanediol di(meth)acrylate, neopentyl glycol di(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol penta(meth)acrylate, dipentaerythritol hexa(meth)acrylate, bisphenol A epoxy (meth)acrylate, bisphenol A di(meth)acrylate, trimethylolpropane tri(meth)acrylate, ethylene glycol monomethyl ether (meth)acrylate, novolac epoxy (meth)acrylate, propylene glycol di(meth)acrylate, tris(meth)acryloyloxyethyl phosphate, or a combination thereof.

In the composition, the amount of the (photo)polymerizable monomer may be greater than or equal to about 0.5 wt %, for example, greater than or equal to about 1 wt %, or greater than or equal to about 2 wt % with respect to a total weight (or a total solid content) of the composition. The amount of the (photo)polymerizable monomer may be less than or equal to about 50 wt %, for example, less than or equal to about 40 wt %, less than or equal to about 30 wt %, less than or equal to about 28 wt %, less than or equal to about 25 wt %, less than or equal to about 23 wt %, less than or equal to about 20 wt %, less than or equal to about 18 wt %, less than or equal to about 17 wt %, less than or equal to about 16 wt %, or less than or equal to about 15 wt % with respect to a total weight (or a total solid content) of the composition.

The (photo) initiator included in the composition may be for the polymerization of the (photo)polymerizable monomer. The initiator may be a compound that can generate a radical species under a mild condition (e.g., by light or heat) to promote the initiation of a radical reaction (e.g., a radical polymerization of a monomer). The initiator may be a thermal initiator or a photoinitiator. The initiator is not particularly limited and may be selected appropriately.

Examples of the thermal initiator may include azobisisobutyronitrile (AIBN), benzoyl peroxide (BPO) or the like but are not limited thereto.

The photoinitiator may be a compound that can initiate a radical polymerization of the aforementioned photopolymerizable (e.g., acryl based) monomer, a thiol compound that will be described below, or a combination thereof. Types of the photoinitiator is not particularly limited. In an embodiment, the photoinitiator may include a triazine compound, an acetophenone compound, a benzophenone compound, a thioxanthone compound, a benzoin compound, an oxime compound, an aminoketone compound, a phosphine or phosphine oxide compound, a carbazole compound, a diketone compound, a sulfonium borate compound, a diazo compound, a diimidazole compound, a carbazole compound, a diketone compound, a sulfonium borate compound, an azo compound (e.g., diazo compound), a biimidazole compound, or a combination thereof.

In the composition of an embodiment, an amount of the initiator may be adjusted taking into consideration the types and the amount of the photopolymerizable monomer used. In an embodiment, the amount of the initiator may be greater than or equal to about 0.01 wt % or greater than or equal to about 1 wt % and less than or equal to about 10 wt %, less than or equal to about 9 wt %, less than or equal to about 8 wt %, less than or equal to about 7 wt %, less than or equal to about 6 wt %, or less than or equal to about 5 wt %, based on a total weight (or a total solid content) of the composition, but is not limited thereto.

The (photosensitive) composition or a quantum dot polymer composite that will be described in detail below may further include a thiol compound (e.g., a monothiol compound or a polythiol compound having at least two thiol groups) or a moiety derived therefrom, a metal oxide fine particle, or a combination thereof.

When a plurality of metal oxide fine particles is present in the polymer matrix, the metal oxide fine particles may include $TiO_2$, $SiO_2$, $BaTiO_3$, $Ba_2TiO_4$, ZnO, or a combination thereof. A particle size of the metal oxide fine particles is not particularly limited and may be selected appropriately. The particle size of the metal oxide fine particles may be greater than or equal to about 100 nm, greater than or equal to about 150 nm, or greater than or equal to about 200 nm and less than or equal to about 1,000 nm, less than or equal to about 900 nm, or less than or equal to about 800 nm. The metal oxide fine particles may be non-light emissive.

An amount of the metal oxide fine particle may be less than or equal to about 50 wt %, less than or equal to about 40 wt %, less than or equal to about 30 wt %, less than or equal to about 25 wt %, less than or equal to about 20 wt %, less than or equal to about 15 wt %, less than or equal to about 10 wt %, less than or equal to about 5 wt %, based on a total weight (or a total solid content) of the composition. An amount of the metal oxide fine particle may be greater than or equal to about 1 wt %, greater than or equal to about 5 wt %, or greater than or equal to about 10 wt %, based on a total weight (or a total solid content) of the composition.

The polythiol compound may include a compound represented by Chemical Formula 1:

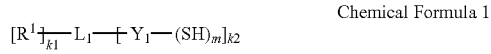

Chemical Formula 1 wherein, $R^1$ is hydrogen; a substituted or unsubstituted C1 to C30 linear or branched alkyl group; a substituted or unsubstituted C6 to C30 aryl group; a substituted or unsubstituted C3 to C30 heteroaryl group; a substituted or unsubstituted C3 to C30 cycloalkyl group; a substituted or unsubstituted C3 to C30 heterocycloalkyl group; a C1 to C10 alkoxy group; a hydroxy group; —$NH_2$; a substituted or unsubstituted C1 to C30 amine group, wherein —NRR', wherein R and R' are independently hydrogen or C1 to C30 linear or branched alkyl group, but simultaneously not hydrogen; an isocyanate group; a halogen; —ROR', wherein R is a substituted or unsubstituted C1 to C20 alkylene group and R' is hydrogen or a C1 to C20 linear or branched alkyl group; an acyl halide, wherein —RC(=O)X, wherein R is a substituted or unsubstituted alkylene group and X is a halogen; —C(=O)OR', wherein R' is hydrogen or a C1 to C20 linear or branched alkyl group; —ON; —C(=O)NRR', wherein R and R' are independently hydrogen or a C1 to C20 linear or branched alkyl group; —C(=O)ONRR', wherein R and R' are independently hydrogen or a C1 to C20 linear or branched alkyl group; or a combination thereof, $L_1$ is a carbon atom, a substituted or unsubstituted C1 to C30 alkylene group, a substituted or unsubstituted C1 to C30 alkylene group wherein a methylene is replaced by a sulfonyl moiety, a carbonyl moiety, an ether moiety, a sulfide moiety, a sulfoxide moiety, an ester moiety, an amide moiety comprising hydrogen or a C1 to C10 alkyl group, or a combination thereof, a substituted or unsubstituted C3 to C30 cycloalkylene group, a substituted or unsubstituted C6 to C30 arylene group, a substituted or unsubstituted C3 to C30 heteroarylene group, or a substituted or unsubstituted C3 to C30 heterocycloalkylene group, $Y_1$ is a single bond; a substituted or unsubstituted C1 to C30 alkylene group; a substituted or unsubstituted C2 to C30 alkenylene group; or a substituted or unsubstituted C1 to C30 alkylene group or a substituted or unsubstituted C2 to C30 alkenylene group wherein a methylene is replaced by a sulfonyl moiety, a carbonyl moiety, an ether moiety, a sulfide moiety, a sulfoxide moiety, an ester moiety, an amide moiety comprising hydrogen or a C1 to C10 linear or branched alkyl group, an imine moiety comprising hydrogen or a C1 to C10 linear or branched alkyl group, or a combination thereof, m is an integer of 1 or greater, k1 is 0 or an integer of 1 or greater, k2 is an integer of 1 or greater, and a sum of m and k2 is an integer of 3 or greater, provided that m does not exceed the valence of $Y_1$ and a sum of k1 and k2 does not exceed the valence of $L_1$.

The polythiol compound may include a dithiol compound, a trithiol compound, a tetrathiol compound, or a combination thereof. For example, the polythiol compound may include glycol di-3-mercaptopropionate (e.g., ethylene glycol di-3-mercaptopropionate), glycol dimercaptoacetate (e.g., ethylene glycol dimercaptoacetate), trimethylolpropane tris(3-mercaptopropionate), pentaerythritol tetrakis(3-mercaptopropionate), pentaerythritol tetrakis(2-mercaptoacetate), 1,6-hexanedithiol, 1,3-propanedithiol, 1,2-ethanedithiol, polyethylene glycol dithiol including 1 to 10 ethylene glycol repeating units, or a combination thereof.

Based on a total weight (or a total solid content) of the composition, an amount of the thiol compound may be less than or equal to about 50 wt %, less than or equal to about 40 wt %, less than or equal to about 30 wt %, less than or equal to about 20 wt %, less than or equal to about 15 wt %, or less than or equal to about 10 wt %. The amount of the thiol compound may be greater than or equal to about 0.1 wt %, greater than or equal to about 0.5 wt %, greater than or equal to about 1 wt %, greater than or equal to about 2 wt %, greater than or equal to about 3 wt %, greater than or equal to about 4 wt %, greater than or equal to about 5 wt %, greater than or equal to about 6 wt %, greater than or equal to about 7 wt %, greater than or equal to about 8 wt %, greater than or equal to about 9 wt %, greater than or equal to about 10 wt %, greater than or equal to about 15 wt %, or greater than or equal to about 20 wt %, based on a total weight (or a total solid content) of the composition.

The composition may further include an organic solvent (or a liquid vehicle) (hereinafter, simply referred to as "solvent"). The solvent is not particularly limited. Types and amounts of the solvent may be appropriately selected by taking into consideration the aforementioned main components (i.e., the quantum dot, the dispersing agent, the photopolymerizable monomer, the photoinitiator, and if used, the thiol compound), and types and amounts of additives which will be described below. The composition may include a solvent in a residual amount except for a desired amount of the solid content (non-volatile components).

Examples of the solvent may include, but are not limited to: ethyl 3-ethoxy propionate; an ethylene glycol series such as ethylene glycol, diethylene glycol, or polyethylene glycol; a glycol ether such as ethylene glycol monomethyl ether, ethylene glycol monoethyl ether, diethylene glycol monomethyl ether, ethylene glycol diethyl ether, or diethylene glycol dimethyl ether; glycol ether acetates such as ethylene glycol monomethyl ether acetate, ethylene glycol monoethyl ether acetate, diethylene glycol monoethyl ether acetate, or diethylene glycol monobutyl ether acetate; a propylene glycol series such as propylene glycol; a propylene glycol ether such as propylene glycol monomethyl ether, propylene glycol monoethyl ether, propylene glycol monopropyl ether, propylene glycol monobutyl ether, propylene glycol dimethyl ether, dipropylene glycol dimethyl ether, propylene glycol diethyl ether, or dipropylene glycol diethyl ether; a propylene glycol ether acetate such as propylene glycol monomethyl ether acetate or dipropylene glycol monoethyl ether acetate; an amide such as N-methylpyrrolidone, dimethyl formamide, or dimethyl acetamide; a ketone such as methyl ethyl ketone (MEK), methyl isobutyl ketone (MIBK), or cyclohexanone; a petroleum product such as toluene, xylene, or solvent naphtha; an ester such as ethyl acetate, propyl acetate, butyl acetate, cyclohexyl acetate, or ethyl lactate; an ether such as diethyl ether, dipropyl ether, or dibutyl ether; chloroform, a C1 to C40 aliphatic hydrocarbon (e.g., alkane, alkene, or alkyne), a halogen (e.g., chloro) substituted C1 to C40 aliphatic hydrocarbon (e.g., dichloroethane, trichloromethane, or the like), a C6 to C40 aromatic hydrocarbon (e.g., toluene, xylene, or the like), a halogen (e.g., chloro) substituted C6 to C40 aromatic hydrocarbon, or a combination thereof.

The composition may further include various additives such as a light diffusing agent, a leveling agent, or a coupling agent, in addition to the aforementioned components. The amount of the additive is not particularly limited, and may be selected within an appropriate range, wherein the additive does not cause an adverse effect on the preparation of the composition, the preparation of the quantum dot-polymer composite, and optionally, the patterning of the composite. Types and examples of the aforementioned additives may include any suitable compound having a desired function and are not particularly limited.

If present, the amount of the additives may be, based on a total weight of the composition (or a total solid content of the composition), greater than or equal to about 0.1 wt %, for example, greater than or equal to about 0.5 wt %, greater than or equal to about 1 wt %, greater than or equal to about 2 wt %, or greater than or equal to about 5 wt %, but is not limited thereto. If present, the amount of the additives may be less than or equal to about 20 wt %, for example, less than or equal to about 19 wt %, less than or equal to about 18 wt %, less than or equal to about 17 wt %, less than or equal to about 16 wt %, or less than or equal to about 15 wt %, but is not limited thereto.

The composition according to an embodiment may be prepared by a method including: preparing quantum dot dispersion including the aforementioned quantum dots, the dispersing agent, and the solvent; and mixing the quantum dot dispersion with the initiator; the polymerizable monomer (e.g., acryl-based monomer); optionally the thiol compound; optionally the metal oxide particulate, and optionally the additives. Each component may be mixed sequentially or simultaneously, but a mixing order is not particularly limited.

The composition may provide a quantum dot-polymer composite or a quantum dot-polymer composite pattern via polymerization (e.g., photopolymerization).

In an embodiment, a quantum dot-polymer composite may include a polymer matrix; and the aforementioned quantum dots dispersed in the polymer matrix.

The polymer matrix may include a dispersing agent (e.g., a binder polymer including a carboxylic acid group), a polymerization product (e.g., insulating polymer) of a polymerizable monomer including a carbon-carbon double bond (at least one, for example, at least two, at least three, at least four, or at least five), optionally a polymerization product of the polymerizable monomer a polythiol compound including at least two thiol groups (e.g., at a terminal end of the polythiol compound), or a combination thereof. The quantum dot polymer composite may further include a metal oxide fine particle(s). Two or more of the foregoing components (e.g., dispersing agent, polymerization product, metal oxide fine particles) can be present.

In an embodiment, the polymer matrix may include a cross-linked polymer and a dispersing agent (e.g., (carboxyl group-contained) binder polymer). The polymer matrix may not include a conjugated polymer (except for a cardo binder). The cross-linked polymer may include a thiolene resin, a cross-linked poly(meth)acrylate, or a combination thereof. In an embodiment, the cross-linked polymer may be a polymerization product of the polymerizable monomer and, optionally, the polythiol compound.

Details of the quantum dots, the dispersing agent, or the binder polymer, the polymerizable monomer, and the polythiol compound are the same as described above.

An amount of the quantum dots (or an amount of the metal oxide fine particle) in the composite may be corresponded to the aforementioned amount range based on a total solid content of the composition. In the composite, an amount of the polymer matrix may be greater than or equal to about 3 wt %, greater than or equal to about 5 wt %, greater than or equal to about 10 wt %, greater than or equal to about 15 wt %, greater than or equal to about 20 wt %, or any combination thereof, based on a total weight of the composite. In the composite, an amount of the polymer matrix may be less than or equal to about 97 wt %, less than or equal to about 95 wt %, less than or equal to about 90 wt %, less than or equal to about 80 wt %, less than or equal to about 70 wt %, or any combination thereof, based on a total weight of the composite.

The film of the quantum dot-polymer composite (or the quantum dot-polymer composite pattern that will be described below) may have, for example, a thickness of less than or equal to about 30 μm, for example less than or equal to about 25 μm, less than or equal to about 20 μm, less than or equal to about 15 μm, less than or equal to about 10 μm, less than or equal to about 8 μm, less than or equal to about 7 μm and greater than about 2 μm, for example, greater than or equal to about 3 μm, greater than or equal to about 3.5 μm, greater than or equal to about 4 μm, greater than or equal to about 5 μm, or greater than or equal to about 6 μm.

In an embodiment, a patterned film includes a repeating section including a first section emitting first light, wherein the first section includes the quantum dot-polymer composite.

The repeating section may include a second section emitting second light having a different maximum (photo) luminescent peak wavelength from a maximum (photo) luminescent peak wavelength of the first light. The second section may include a quantum dot-polymer composite. The quantum dot-polymer composite of the second section may include a second quantum dot configured to emit the second light. The second quantum dot may include the aforementioned quantum dot. The first light or the second light may be red light having a maximum photoluminescence peak wavelength which is present between about 600 nm and about 650 nm (e.g., about 620 nm to about 650 nm) or green light having a maximum photoluminescence peak wavelength which is present between about 500 nm and about 550 nm (e.g., about 510 nm to about 540 nm). The patterned film may further include a third section emitting or passing third light (e.g., blue light) different from the first light and the second light. The third light may have a maximum (photo) luminescent peak wavelength ranging from 380 nm to 480 nm.

In an embodiment, a display device includes a light source and a photoluminescence (hereinafter, also can be referred to as light emitting) element, and the photoluminescence element includes a substrate and an emission layer disposed on the substrate, and the emission layer includes a film or patterned film of the quantum dot-polymer composite. The light source is configured to provide the photoluminescence element with incident light. The incident light may have a luminescence peak wavelength of greater than or equal to about 440 nm, for example, greater than or equal to about 450 nm and less than or equal to about 500 nm, for example, less than or equal to about 480 nm, less than or equal to about 470 nm, or less than or equal to about 460 nm.

In an embodiment, the light emitting element may include a sheet of the quantum dot polymer composite. The display device may further include a liquid crystal panel and the sheet of the quantum dot polymer composite may be disposed between the light source and the liquid crystal panel.

In the display of an embodiment, the light emitting layer may include a pattern of the quantum dot polymer composite. The pattern may include at least one repeating section configured to emit light of a predetermined wavelength. The pattern of the quantum dot polymer composite may include a first repeating section that may emit a first light, a second repeating section that may emit a second light, or a combination thereof. Preparation of the pattern of the quantum dot polymer composite may be carried out by a photolithography method or an ink-jet method.

The first light and the second light have a different maximum photoluminescence peak wavelength in a photoluminescence spectrum. In an embodiment, the first light may be red light (R) having a maximum photoluminescence peak wavelength of about 600 nm to about 650 nm (e.g., about 620 nm to about 650 nm), the second light may be green light (G) having a maximum photoluminescence peak wavelength of about 500 nm to about 550 nm (e.g., about 510 nm to about 550 nm), or vice versa (i.e., the first light may be a green light and the second light may be a red light).

The pattern may further include a third section that may emit a third light (e.g., blue light) different from the first and the second lights, transmit a third light (e.g., blue light) different from the first and the second lights, or emit and transmit a third light (e.g., blue light) different from the first and the second lights. A maximum (e.g., photoluminescence) peak wavelength of the third light may be greater than or equal to about 380 nm and less than or equal to about 480 nm.

The first section may be a red light emitting section, the second section may be a green light emitting section, and the light source may be an element emitting blue light and optionally green light. The green light emitting section may include the aforementioned quantum dots.

An optical element (e.g., an excitation light blocking layer or a first optical filter which will be described below) for blocking (e.g., reflecting or absorbing) excitation light (e.g., blue light, green light, or blue light and green light) may be disposed on a front surface (a light-emitting surface) of the first section, the second section, or a combination thereof.

In the display device, the light source may include a plurality of light emitting units corresponding to the first section and the second section, respectively, and the light emitting units may include a first electrode and a second electrode facing each other and an electroluminescence layer disposed between the first electrode and the second electrode. The electroluminescence layer may include an organic light emitting material. For example, each light emitting unit of the light source may include an electroluminescent device (e.g., an organic light emitting diode (OLED)) configured to emit light of a predetermined wavelength (e.g., blue light, green light, or a combination thereof). Structures and materials of the electroluminescent device and the organic light emitting diode (OLED) may be selected appropriately and are not particularly limited. The light source includes an organic light emitting diode (OLED) emitting blue light (and optionally, green light).

Figure 4A:
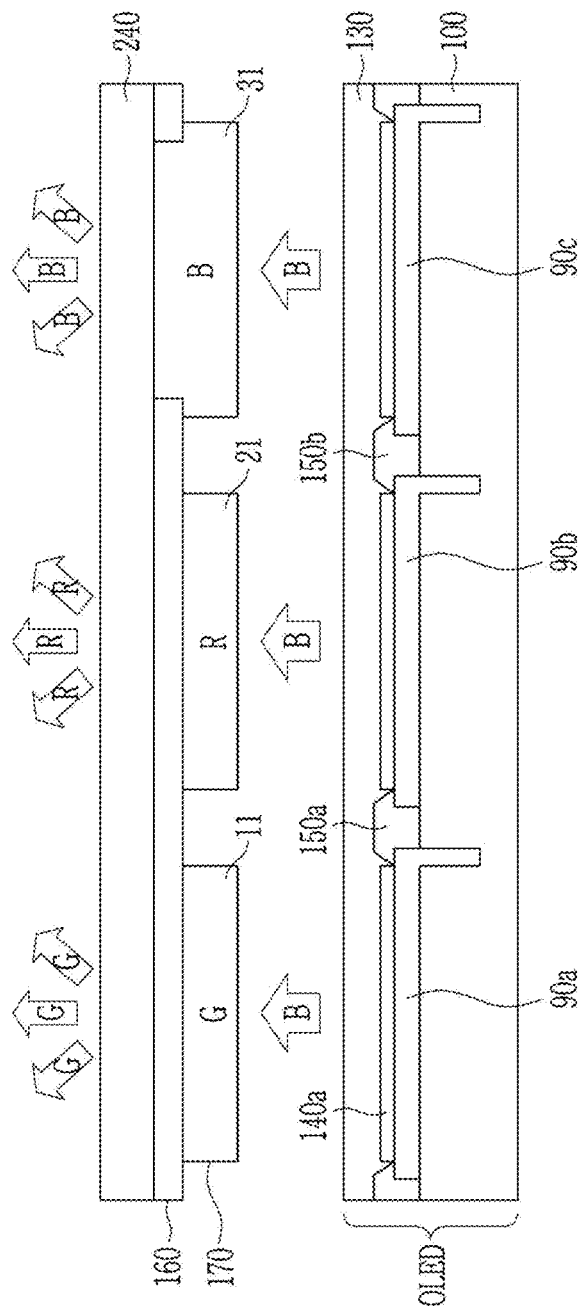
FIG. 4A is a cross-sectional view of a display device according to an embodiment.
Figure 4B:
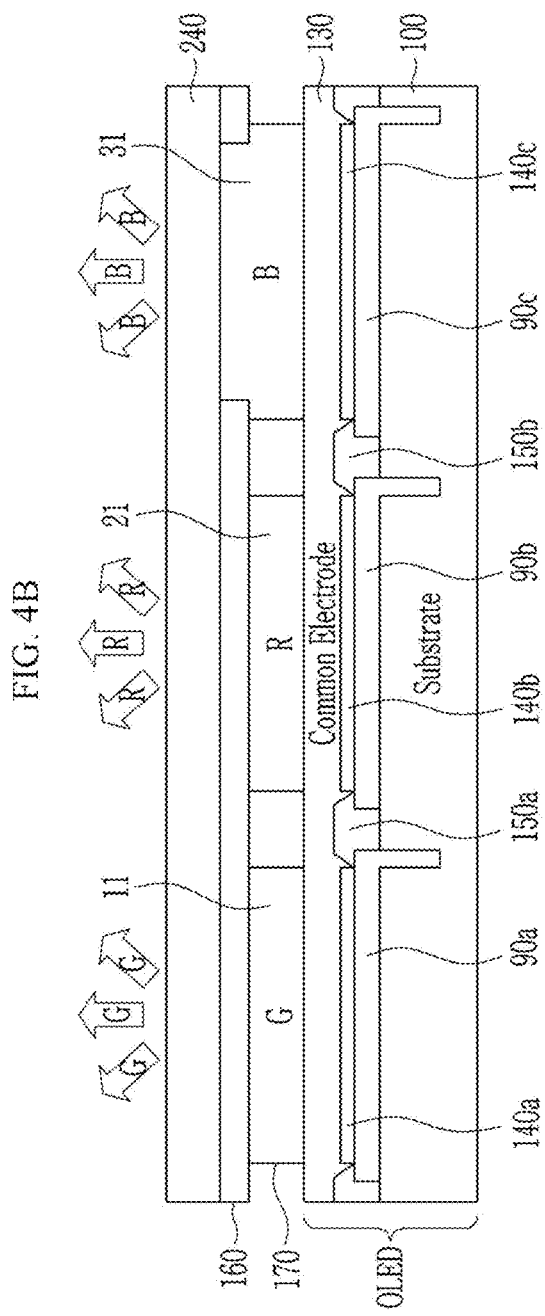
FIG. 4B is a cross-sectional view of a display device according to an embodiment.

FIG. 4A is a schematic cross-sectional view of a display device according to an embodiment and FIG. 4B is a schematic cross-sectional view of display device according to an embodiment. Referring to FIGS. 4A and 4B, a light source includes an organic light emitting diode (OLED)

emitting blue light, green light, or a combination thereof. The light of the OLED can be based upon phosphorescent emission, fluorescent emission, or a combination of the two. The organic light emitting diode OLED may include (at least two, for example, three or more) pixel electrodes 90a, 90b, 90c formed on a substrate 100, a pixel defining layer 150a, 150b formed between the adjacent pixel electrodes 90a, 90b, 90c, an organic light emitting layer 140a, 140b, 140c formed on the pixel electrodes 90a, 90b, 90c, and a common electrode layer 130 formed on the organic light emitting layer 140a, 140b, 140c.

A thin film transistor and a substrate may be disposed under the organic light emitting diode (OLED).

The pixel areas of the organic light emitting diode OLED may be disposed corresponding to the first, second, and third sections that will be described in detail below, respectively.

A stack structure including a quantum dot-polymer composite (e.g., a section including red quantum dot R and a section including green quantum dot G) pattern and a substrate may be disposed on the light source. The sections are configured so that excitation light (e.g., blue light) emitted from the light source is entered thereinto and red light and green light may be emitted, respectively. Excitation light (e.g., blue light or green light) emitted from the light source may pass through the third section.

The light (e.g., blue light, green light, or blue light and green light) emitted from the light source may enter the second section 21 and the first section 11 of the quantum dot-polymer composite pattern 170 to emit (e.g., converted) red light R and green light G, respectively. The excitation light B emitted from the light source passes through or transmits from the third section 31. Over the second section emitting red light, the first section emitting green light, or a combination thereof, an optical element 160 may be disposed. The optical element may be an excitation light (blue) cut layer which cuts (e.g., reflects or absorbs) blue light and optionally green light, or a first optical filter. The excitation light (e.g., blue, green, or blue and green) cut layer 160 may be disposed on the upper substrate 240. The excitation light cut layer 160 may be disposed between the upper substrate 240 and the quantum dot-polymer composite pattern and over the first section 11 and the second section 21. Details of the excitation light (blue) cut layer are the same as set forth for the first optical filter 310 below.

The display device may be obtained by separately fabricating the stack structure and (e.g., blue light emitting) LED or OLED and then assembling the same. The device may be obtained by forming a quantum dot-polymer composite pattern directly on the LED or OLED.

The substrate may be a substrate including an insulating material. The substrate may include glass; various polymers such as a polyester (e.g., polyethylene terephthalate (PET) polyethylene naphthalate (PEN), a polymethacrylate, or a polyacrylate); a polycarbonate; a polysiloxane (e.g., polydimethylsiloxane (PDMS)); an inorganic material such as $Al_2O_3$ or ZnO; or a combination thereof, but is not limited thereto. A thickness of the substrate may be selected appropriately taking into consideration a substrate material but is not particularly limited. The substrate may have flexibility. The substrate may have a transmittance of greater than or equal to about 50%, greater than or equal to about 60%, greater than or equal to about 70%, greater than or equal to about 80%, or greater than or equal to about 90% for light emitted from the quantum dot.

A wire layer including a thin film transistor or the like is formed on the substrate. The wire layer may further include a gate line, a sustain voltage line, a gate insulating layer, a data line, a source electrode, a drain electrode, a semiconductor, a protective layer, and the like. The detail structure of the wire layer may be verified according to an embodiment. The gate line and the sustain voltage line are electrically separated from each other, and the data line is insulated and crossing the gate line and the sustain voltage line. The gate electrode, the source electrode, and the drain electrode form a control terminal, an input terminal, and an output terminal of the thin film transistor, respectively. The drain electrode is electrically connected to the pixel electrode that will be described below.

The pixel electrode may function as an anode of the display device. The pixel electrode may be formed of a transparent conductive material such as indium tin oxide (ITO) or indium zinc oxide (IZO). The pixel electrode may be formed of a material having a light-blocking property such as gold (Au), platinum (Pt), nickel (Ni), tungsten (W), chromium (Cr), molybdenum (Mo), iron (Fe), cobalt (Co), copper (Cu), palladium (Pd), or titanium (Ti). The pixel electrode may have a two-layered structure in which the transparent conductive material and the material having light-blocking properties are stacked sequentially.

Between two adjacent pixel electrodes, a pixel define layer (PDL) may overlap with a terminal end of the pixel electrode to divide the pixel electrode into a pixel unit. The pixel define layer is an insulation layer which may electrically block the at least two pixel electrodes.

The pixel define layer covers a part of the upper surface of the pixel electrode, and the remaining region of the pixel electrode not covered by the pixel define layer may provide an opening. An organic emission layer that will be described below may be formed on the region defined by the opening.

The organic emission layer defines each pixel area by the pixel electrode and the pixel define layer. In other words, one pixel area may be defined as an area formed with one organic emission unit layer which is contacted with one pixel electrode divided by the pixel define layer.

For example, in the display device according to an embodiment, the organic emission layer may be defined as a first pixel area, a second pixel area and a third pixel area, and each pixel area is spaced apart from each other leaving a predetermined interval by the pixel define layer.

In an embodiment, the organic emission layer may emit a third light belong to visible light region or belong to UV region. That is, each of the first to the third pixel areas of the organic emission layer may emit a third light. In an embodiment, the third light may be a light having the highest energy in the visible light region, for example, may be blue light, green light, or blue light and green light. When all pixel areas of the organic emission layer are designed to emit the same light, each pixel area of the organic emission layer may be all formed of the same or similar materials or may exhibit the same or similar properties. A process difficulty of forming the organic emission layer may be decreased, and the display device may be applied for, e.g., formed by or used in, a large scale/large area process. However, the organic emission layer according to an embodiment is not necessarily limited thereto, but the organic emission layer may be designed to emit at least two different lights.

The organic emission layer includes an organic emission unit layer in each pixel area, and each organic emission unit layer may further include an auxiliary layer (e.g., hole injection layer (HIL), hole transport layer (HTL), electron transport layer (ETL), etc.) besides the emission layer.

The common electrode may function as a cathode of the display device. The common electrode may be formed of a transparent conductive material such as indium tin oxide (ITO) or indium zinc oxide (IZO). The common electrode may be formed on the organic emission layer and may be integrated therewith.

A planarization layer or a passivation layer may be formed on the common electrode. The planarization layer may include a (e.g., transparent) insulating material for ensuring electrical insulation with the common electrode.

In an embodiment, the display device may further include a lower substrate, a polarizer disposed under the lower substrate, and a liquid crystal layer disposed between the stack structure and the lower substrate, and in the stack structure, the light emission layer may be disposed to face the liquid crystal layer. The display device may further include a polarizer between the liquid crystal layer and the emission layer. The light source may further include LED and if desired, a light guide panel.

Non-limiting examples of the display device (e.g., a liquid crystal display device) according to an embodiment are illustrated with a reference to a drawing. FIG. 5 is a schematic cross-sectional view showing a liquid crystal display according to an embodiment. The display device of an embodiment includes a liquid crystal panel 200, a polarizer 300 disposed under the liquid crystal panel 200, and a backlight unit (BLU) disposed under the polarizer 300.

The liquid crystal panel 200 may include a lower substrate 210, a stack structure, and a liquid crystal layer 220 disposed between the stack structure and the lower substrate. The stack structure includes a transparent substrate (or an upper substrate) 240 and a photoluminescent layer 230 including a pattern including a quantum dot-polymer composite.

The lower substrate 210 (also referred to as an array substrate) may be a transparent insulating material substrate. The substrate is the same as described above. A wire plate 211 is provided on an upper surface of the lower substrate 210. The wire plate 211 may include a plurality of gate wires and data wires that define a pixel area, a thin film transistor disposed adjacent to a crossing region of gate wires and data wires, and a pixel electrode for each pixel area, but is not limited thereto. Details of such a wire plate are known and are not particularly limited.

The liquid crystal layer 220 may be disposed on the wire plate 211. The liquid crystal layer 220 may include an alignment layer 221 on and under the liquid crystal layer 220 to initially align the liquid crystal material included therein. Details (e.g., a liquid crystal material, an alignment layer material, a method of forming liquid crystal layer, a thickness of liquid crystal layer, or the like) of the liquid crystal material and the alignment layer are known and are not particularly limited.

A lower polarizer 300 is provided under the lower substrate. Materials and structures of the polarizer 300 are known and are not particularly limited. A backlight unit (e.g., emitting blue light) may be disposed under the polarizer 300.

An upper optical element or an upper polarizer 300 may be provided between the liquid crystal layer 220 and the transparent substrate 240, but is not limited thereto. For example, the upper polarizer may be disposed between the liquid crystal layer 220 and the light emission layer 230. The polarizer may be any polarizer that used in a liquid crystal display device. The polarizer may be TAC (triacetyl cellulose) having a thickness of less than or equal to about 200 μm, but is not limited thereto. In an embodiment, the upper optical element may be a coating that controls a refractive index without a polarization function.

The backlight unit includes a light source 110. The light source may emit blue light or white light. The light source may include a blue (or green) LED, a (white) LED, a (white) OLED, or a combination thereof, but is not limited thereto.

The backlight unit may further include a light guide panel 120. In an embodiment, the backlight unit may be an edge-type lighting. For example, the backlight unit may include a reflector, a light guide panel provided on the reflector and providing a planar light source with the liquid crystal panel 200, at least one optical sheet on the light guide panel, for example, a diffusion plate, a prism sheet, and the like, or a combination thereof, but is not limited thereto. The backlight unit may not include a light guide panel. In an embodiment, the backlight unit may be a direct lighting. For example, the backlight unit may have a reflector, and may have a plurality of fluorescent lamps disposed on the reflector at regular intervals, or may have an LED operating substrate on which a plurality of light emitting diodes may be disposed, a diffusion plate thereon, and optionally at least one optical sheet. Details (e.g., each component of a light emitting diode, a fluorescent lamp, light guide panel, various optical sheets, and a reflector) of such a backlight unit are known and are not particularly limited.

A black matrix 241 is provided under the transparent substrate 240 and has openings and hides a gate line, a data line, and a thin film transistor of the wire plate on the lower substrate. For example, the black matrix 241 may have a lattice shape. The photoluminescent layer 230 is provided in the openings of the black matrix 241 and has a quantum dot-polymer composite pattern including a first section (R) configured to emit a first light (e.g., red light), a second section (G) configured to emit a second light (e.g., green light), and a third section (B) configured to emit/transmit, for example blue light. If desired, the photoluminescent layer may further include at least one fourth section. The fourth section may include a quantum dot that emits different color from light emitted from the first to third sections (e.g., cyan, magenta, and yellow light).

In the light emission layer 230, sections forming a pattern may be repeated corresponding to pixel areas formed on the lower substrate. A transparent common electrode 231 may be provided on the photoluminescent layer 230 (e.g., photoluminescent color filter layer).

The third section (B) configured to emit excitation light or a portion thereof (e.g., blue light), transmit excitation light or a portion thereof (e.g., blue light), or emit a portion of excitation light and transmit a portion of excitation light may be a transparent color filter that does not change a light emitting spectrum of the light source. In this case, blue light emitted from the backlight unit may enter in a polarized state and may be emitted through the polarizer and the liquid crystal layer. If desired, the third section may include a quantum dot emitting blue light.

If desired, the display device may further include an excitation light (blue, green, or a combination thereof) blocking layer (cut filter) or a first optical filter layer. The excitation light blocking layer may be disposed between bottom surfaces of the first section (R), the second section (G), and optionally the third section (B) and the upper substrate 240 or on a top surface of the upper substrate 240. The excitation (blue) light blocking layer may include a sheet having openings that correspond to a pixel area showing a blue color (e.g., third section). In an embodiment, the excitation light may further include green light together with blue light and the third section (e.g., blue pixel) may further include a green light cut filter. The excitation light blocking layer may be formed on portions corresponding to the first and second sections and optionally the third section. The first optical filter layer may be integrally formed as one body structure at the portions except portions overlapped with the third section, but is not limited thereto. At least two (e.g., three) first optical filter layers may be spaced apart and be disposed on each of the positions overlapped with the first and the second sections and optionally the third section.

In an embodiment, the first optical filter layer may block light having a portion of a wavelength region in the visible light region. The first optical filter layer may transmit light having other (visible light) wavelength regions. For example, the first optical filter layer may block blue light (or green light) and transmit light except blue (or green) light. For example, the first optical filter layer may transmit green light, red light, or yellow light that is mixed light thereof. The first optical filter layer may transmit blue light and block the green light and may be disposed on the blue light emitting pixel.

In an embodiment, the first optical filter layer may substantially block blue light having a wavelength of less than or equal to about 500 nm. The first optical filter layer may transmit light in another visible light wavelength region of greater than about 500 nm and less than or equal to about 700 nm.

In an embodiment, the first optical filter layer may have light transmittance of greater than or equal to about 70%, greater than or equal to about 80%, greater than or equal to about 90%, or about 100% with respect to a visible light of a desired wavelength range (e.g., that may be in a range of about 500 nm to about 700 nm).

The first optical filter layer may include a polymer thin film including a dye, a pigment, or a combination thereof that absorbs light having a wavelength to be blocked. The first optical filter layer may block at least 80%, at least 90%, or at least 95% of excitation light (e.g., having a wavelength of less than or equal to about 480 nm) and may have light transmittance of greater than or equal to about 70%, greater than or equal to about 80%, greater than or equal to about 90%, or about 100% with respect to a visible light of a desired wavelength range (e.g., in a range of greater than or equal to about 500 nm and less than or equal to about 700 nm).

The first optical filter layer may block (e.g., absorb) and substantially block excitation light or a portion thereof (e.g., blue light having a wavelength of less than or equal to about 500 nm or green light or a combination thereof) and for example may selectively transmit light of a desired wavelength (e.g., green light or red light or optionally blue light). In this case, at least two first optical filter layers may be spaced apart and disposed on each of the portions overlapped with the first and second sections, respectively. For example, a first optical filter layer selectively transmitting red light may be disposed on the portion overlapped with the section emitting red light and the first optical filter layer selectively transmitting green light may be disposed on the portion overlapped with the section emitting green light, respectively. A first optical filter layer selectively transmitting blue light may be disposed on the portion overlapped with the section emitting blue light In an embodiment, the first optical filter layer may include a first region, a second region, or a combination thereof, wherein the first region blocks (e.g., absorb) blue light and red light and transmits light having a wavelength of a predetermined range (e.g., greater than or equal to about 500 nm, greater than or equal to about 510 nm, or greater than or equal to about 515 nm and less than or equal to about 550 nm, less than or equal to about 545 nm, less than or equal to about 540 nm, less than or equal to about 535 nm, less than or equal to about 530 nm, less than or equal to about 525 nm, or less than or equal to about 520 nm) and the second region blocks (e.g., absorb) blue light and green light and transmits light having a wavelength of a predetermined range (e.g., greater than or equal to about 600 nm, greater than or equal to about 610 nm, or greater than or equal to about 615 nm and less than or equal to about 650 nm, less than or equal to about 645 nm, less than or equal to about 640 nm, less than or equal to about 635 nm, less than or equal to about 630 nm, less than or equal to about 625 nm, or less than or equal to about 620 nm). The first region may be disposed at a place overlapped with the section emitting green light and the second region may be disposed at a place overlapped with the section emitting red light. When the excitation light includes green light, a first optical filter layer blocking (or absorbing) green light may be disposed on the blue light emitting section.

The first region and the second region may be optically isolated. The first optical filter (layer) may contribute to improving color purity of a display device.

The first optical filter layer may be a reflective filter including a plurality of layers (e.g., inorganic material layers) with different refractive index. For example two layers having different refractive index may be alternately stacked with each other, or for example a layer having a high refractive index and a layer having a low refractive index may be alternately stacked with each other.

As refractive index different between the layer having a high refractive index and the layer having a low refractive index is higher, the first optical filter layer having higher wavelength selectivity may be provided. A thickness and the number of the stacked layer having a high refractive index and the layer having a low refractive index may be determined according to a refractive index of each layer and a reflected wavelength, for example, each layer having a high refractive index may have a thickness of about 3 nm to about 300 nm, and each layer having a low refractive index may have a thickness of about 3 nm to about 300 nm.

A total thickness of the first optical filter layer may be, for example, from about 3 nm to about 10,000 nm, about 300 nm to about 10,000 nm, or about 1,000 nm to about 10,000 nm. The high refractive index layers may have the same thickness, the same material, or a combination thereof as one another or a different thickness, a different material, or a combination thereof from each other. The low refractive index layers may have the same thickness, the same material, or a combination thereof as one another or a different thickness, a different material, or a combination thereof from each other.

The display device may further include a second optical filter layer 311 (e.g., a red/green or yellow light recycling layer) disposed between the light emission layer and the liquid crystal layer (e.g., between a light emission layer and an upper polarizer) and transmitting at least a part of the third light and reflecting at least a part of the first light and the second light. The second optical filter layer may reflect light in a wavelength region of greater than about 500 nm. The first light may be red light, the second light may be green light, and the third light may be blue light.

In the display device according to an embodiment, the second optical filter layer may be formed as an integrated single layer having an approximately planar surface.

In an embodiment, the second optical filter layer may include a monolayer having a low refractive index, for example, the second optical filter may be a transparent thin film having a refractive index of less than or equal to about 1.4, less than or equal to about 1.3, or less than or equal to about 1.2.

The second optical filter layer having a low refractive index may be, for example, a porous silicon oxide, a porous organic material, a porous organic/inorganic composite, or a combination thereof.

In an embodiment, the second optical filter layer may include a plurality of layers having different refractive indexes, for example, the second optical filter layer may be formed by alternately stacking two layers having different refractive indexes, or for example, the second optical filter layer may be formed by alternately stacking material having a high refractive index and material having a low refractive index.

The layer having a high refractive index in the second optical filter layer may include, for example, hafnium oxide, tantalum oxide, titanium oxide, zirconium oxide, magnesium oxide, cesium oxide, lanthanum oxide, indium oxide, niobium oxide, aluminum oxide, silicon nitride, or a combination thereof, but according to an embodiment, the layer having a high refractive index in the second optical filter may include a variety of materials having a higher refractive index than the layer having a low refractive index.

The layer having a low refractive index in the second optical filter layer may include, for example, a silicon oxide, but according to an embodiment, the layer having a low refractive index in the second optical filter may include a variety of materials having a lower refractive index than the layer having a high refractive index.

As the refractive index difference between the layer having a high refractive index and the layer having a low refractive index is the higher, the second optical filter layer may have the higher wavelength selectivity.

In the second optical filter layer, thicknesses of the layer having a high refractive index and the layer having a low refractive index and the stacked number thereof may be determined depending upon a refractive index of each layer and the reflected wavelength, for example, each layer having a high refractive index in the second optical filter layer may have a thickness of about 3 nm to about 300 nm, and each layer having a low refractive index in the second optical filter layer may have a thickness of about 3 nm to about 300 nm. A total thickness of the second optical filter layer may be, for example, from about 3 nm to about 10,000 nm, about 300 nm to about 10,000 nm, or about 1,000 nm to about 10,000 nm. Each of the layer having a high refractive index and the layer having a low refractive index in the second optical filter layer may have the same thickness and materials or different thickness and materials from each other.

The second optical filter layer may reflect at least one part of the first light (R) and the second light (G) and transmits at least a portion (e.g., entire) of the third light (B). For example, the second optical filter layer may transmit only the third light (B) in a blue light wavelength region of less than or equal to about 500 nm and light in a wavelength region of greater than about 500 nm, that is, green light (G), yellow light, red light (R), and the like may be not passed through the second optical filter layer and reflected. Thus the reflected green light and red light may pass through the first and the second sections to be emitted to the outside of the display device 10.

The second optical filter layer may reflect a wavelength region of greater than about 500 nm in greater than or equal to about 70%, greater than or equal to about 80%, or greater than or equal to about 90%, or about 100%.

Meanwhile, the second optical filter layer may have a transmittance to a light of a wavelength region of less than or equal to about 500 nm of, for example, greater than or equal to about 90%, greater than or equal to about 92%, greater than or equal to about 94%, greater than or equal to about 96%, greater than or equal to about 98%, greater than or equal to about 99%, or about 100%.

In an embodiment, the stack structure may be produced by a method using the photoresist composition. The method may include forming a film of the composition on a substrate;

exposing a selected region of the film to light (e.g., a wavelength of less than or equal to about 400 nm); and developing the exposed film with an alkali developing solution to obtain a pattern including the quantum dot-polymer composite.

The substrate and the composition have the same specification as described above. Non-limiting methods of forming the pattern are illustrated, referring to FIG. 6.

The composition is coated to have a predetermined thickness on a substrate in an appropriate method of spin coating, slit coating, and the like (S1). The formed film may be, optionally, pre-baked (PRB) (S2). The pre-baking may be performed by selecting an appropriate condition from known conditions of a temperature, time, an atmosphere, and the like.

The formed (or optionally pre-baked) film is exposed to light having a predetermined wavelength under a mask having a predetermined pattern (EXP) (S3). A wavelength and intensity of the light may be selected taking into consideration types and amounts of the photoinitiator, types and amounts of the quantum dots, and the like.

The exposed film is treated with an alkali developing solution (e.g., dipping or spraying) to dissolve an unexposed region and obtain a desired pattern (DEV) (S4). The obtained pattern may be, optionally, post-baked (FOB) to improve crack resistance and solvent resistance of the pattern, for example, at about 150° C. to about 230° C. for a predetermined time (e.g., greater than or equal to about 10 minutes or greater than or equal to about 20 minutes) (S5). The quantum dot polymer composite including the quantum dot of an embodiment may exhibit an excitation light conversion rate of greater than about 29%, for example, greater than or equal to about 30%, or greater than or equal to about 31%.

In an embodiment in which the quantum dot-polymer composite pattern has a plurality of repeating sections, a quantum dot-polymer composite having a desired pattern may be obtained by preparing a plurality of compositions including a quantum dot having desired photoluminescence properties (a photoluminescence peak wavelength and the like) to form each repeating section (e.g., a red light emitting quantum dot, a green light emitting quantum dot, or optionally, a blue light emitting quantum dot) and an appropriate number of times (e.g., twice or more or three times or more) repeating a formation of the above pattern about each composition (S6). For example, the quantum dot-polymer composite may have, e.g., be provided in, a pattern including at least two repeating color sections (e.g., RGB sections). The quantum dot-polymer composite pattern may be used as a photoluminescence-type color filter in a display device.

In an embodiment, the stack structure may be produced using an ink composition. The method may include depositing the same (e.g., to provide a desirable pattern) on the desirable substrate using an appropriate system (e.g., droplet discharging device such as inkjet or nozzle printing device) and heating the same to remove a solvent and to perform a polymerization. The method may provide a highly precise quantum dot-polymer composite film or pattern in a simple and rapid way.

An embodiment provides an electronic device including the quantum dot. The device may include a light emitting diode (LED), an organic light emitting diode (OLED), a sensor, a solar cell, an imaging sensor, or a liquid crystal display (LCD), but is not limited thereto Hereinafter, the embodiments are illustrated in more detail with reference to examples. However, they are exemplary embodiments of the present invention, and the present invention is not limited thereto.

EXAMPLES

Analysis Methods
1. Ultraviolet (UV)-Visible (Vis) Absorption Analysis

An Agilent Cary5000 spectrometer is used to perform a UV-Vis spectroscopy analysis and UV-Visible absorption spectrum is obtained.

2. Photoluminescence Analysis

Photoluminescence Analysis is done using Hitachi F-7000 spectrometer and a photoluminescence spectrum is obtained.

3. ICP Analysis

An inductively coupled plasma-atomic emission spectroscopy (ICP-AES) analysis is performed using Shimadzu ICPS-8100.

4. Brightness and Luminous Efficiency of Quantum Dot Polymer Composite

An amount of blue excitation light (B) is measured by using an integrating sphere. Then, a QD polymer composite is placed in the integrating sphere and is irradiated with the blue excitation light to measure an amount of green (or red) light (A) emitted from the composite and an amount of blue light (B') passing, e.g., through, the composite.

The blue light absorption rate and the quantum efficiency are obtained according to the following formulae:

Blue light absorption rate=$(B-B')/B \times 100\%$

B: Amount of blue excitation light
B': Amount of blue excitation light emitted from composite Reference Example 1

InP Cores are Prepared in the Following Manner

Indium acetate and palmitic acid are dissolved in 1-octadecene in a 200 milliliters (mL) reaction flask, subjected to a vacuum state at 120° C. for one hour. A mole ratio of indium to palmitic acid is 1:3. In one hour, the atmosphere in the reaction flask is exchanged with $N_2$. After the reaction flask is heated to 280° C., a mixed solution of tris(trimethylsilyl)phosphine ($TMS_3P$) and trioctylphosphine (TOP) is quickly injected, and the reaction proceeds for a predetermined time (e.g., for about 20 minutes). The reaction mixture then is rapidly cooled to room temperature and acetone is added thereto to produce nanocrystals, which are then separated by centrifugation and dispersed in toluene to obtain a toluene dispersion of the InP semiconductor nanocrystal core. The amount of the $TMS_3P$ is about 0.5 moles per one mole of indium. A size of the InP core thus obtained is about 2.2 nanometers (nm).

Reference Example 2

[1] Selenium and sulfur are dispersed in trioctylphosphine (TOP) to obtain a Se/TOP stock solution and a S/TOP stock solution, respectively.

In a 200 mL reaction flask, zinc acetate and oleic acid are dissolved in trioctyl amine and the solution is subjected to vacuum at 120° C. for 10 minutes. The atmosphere in the reaction flask is replaced with $N_2$. While the resulting solution is heated to about 320° C., a toluene dispersion of the InP semiconductor nanocrystal core prepared in Reference Example 1 is injected thereto and a predetermined amount of Se/TOP stock solution is injected into the reaction flask several times. A reaction is carried out to obtain a reaction solution including a particle having a ZnSe shell disposed on the InP semiconductor nanocrystal core. A total of reaction time is 100 minutes and a total amount of the Se as used per one mole of the indium is about 8 moles.

Then, at the aforementioned reaction temperature, the 2M S/TOP stock solution is injected slowly to the reaction mixture over the reaction time. A reaction is carried out to obtain a resulting solution including a particle having a ZnS shell disposed on the ZnSe shell. A total of reaction time is 40 minutes and a total amount of the S as used per one mole of the indium is about 18 moles.

An excess amount of ethanol is added to the final reaction mixture including the resulting InP/ZnSe/ZnS semiconductor nanocrystals, which is then centrifuged. After centrifugation, the supernatant is discarded and the precipitate is dried and dispersed in chloroform or toluene to obtain a quantum dot solution (hereinafter, QD solution).

(2) For the obtained QD solution, an ICP-AES analysis is made and the results are shown in Table 1. A UV-vis absorption spectroscopic analysis and a photoluminescence spectroscopic analysis are made for the QD solution, and the results are shown in Table 1.

[2] Production of a quantum dot polymer composite and a pattern thereof (1) Preparation of Quantum Dot-Binder Dispersion A chloroform solution of the quantum dots prepared above is mixed with a solution of a binder polymer, which is a four membered copolymer of methacrylic acid, benzyl methacrylate, hydroxyethyl methacrylate, and styrene, (acid value: 130 milligrams (mg) of KOH per gram (mg KOH/g), molecular weight: 8,000 g/mol, methacrylic acid:benzyl methacrylate:hydroxyethyl methacrylate:styrene (mole ratio)=61.5:12:16.3:10.2) (solvent: propylene glycol monomethyl ether acetate, PGMEA, a concentration of 30 percent by weight, wt %) to form a quantum dot-binder dispersion.

(2) Preparation of a Photosensitive Composition

To the quantum dot-binder dispersion prepared above, a hexaacrylate having the following structure (as a photopolymerizable monomer), ethylene glycol di-3-mercaptopropionate (hereinafter, 2T, as a multi-thiol compound), an oxime ester compound (as an initiator), $TiO_2$ as a metal oxide fine particle, and PGMEA (as a solvent) are added to obtain a composition.

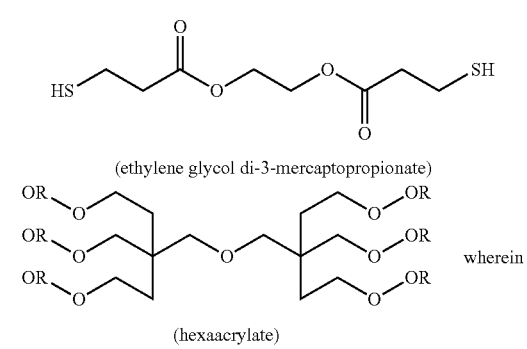

(ethylene glycol di-3-mercaptopropionate)

(hexaacrylate) wherein

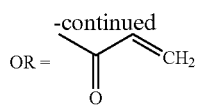

Based on a total solid content, the prepared composition includes 40 wt % of quantum dots, 12.5 wt % of the binder polymer, 25 wt % of 2 T, 12 wt % of the photopolymerizable monomer, 0.5 wt % of the photoinitiator, and 10 wt % of the metal oxide fine particle. The total solid content is about 25 wt %.

(3) Formation of Quantum Dot-Polymer Composite Pattern and Heat Treatment Thereof The composition obtained above is spin-coated on a glass substrate at 150 revolutions per minute (rpm) for 5 seconds (s) to provide a film. The obtained film is pre-baked at 100° C. (PRB). The pre-baked film is exposed to light (wavelength: 365 nanometers (nm), intensity: 100 millijoules, mJ) under a mask having a predetermined pattern (e.g., a square dot or stripe pattern) for 1 second (s) (EXP) and developed with a potassium hydroxide aqueous solution (concentration: 0.043 weight %) for 50 seconds to obtain a pattern of a quantum dot polymer composite (thickness: 6 micrometers (μm)).

The obtained pattern is heat-treated at a temperature of 180° C. for 30 minutes under a nitrogen atmosphere (FOB).

For the obtained pattern film, a photoluminescent peak wavelength, blue light absorption rate and the like are measured and the results are shown in Table 1.

Comparative Example 1

An InP/ZnSe/ZnS quantum dot is prepared in the same manner as set forth in Reference Example 2, except that per one mole of indium, a total amount of the Se and a total amount of the S as used are 6.4 moles and 26.3 moles, respectively.

For the obtained QD solutions, an ICP-AES analysis, an UV-vis absorption spectroscopic analysis and a photoluminescence spectroscopic analysis are made and the results are shown in Table 1.

A quantum dot polymer composite is prepared in the same manner as set forth in Reference Example 2 except for using the quantum dots as obtained in this comparative example, respectively. For the obtained film pattern, blue light absorption and the like are measured and the results are shown in Table 1.

TABLE 1

|  |  | Reference Example 2 | Comp. Ex 1 |
| --- | --- | --- | --- |
| Intensity ratio at 450 nm:350 nm |  | 0.078:1 | 0.049:1 |
| Absorption rate |  | 87% | 81% |

TABLE 1-continued

|  |  | Reference Example 2 | Comp. Ex 1 |
| --- | --- | --- | --- |
| Luminescent wavelength (nm) |  | 540 | 536 |
| ZnSe (nm) |  | 1.3 | 0.8 |
| ZnS (nm) |  | 0.6 | 0.9 |
| ICP | Se:In | 11:1 | 5.4:1 |
|  | S:In | 15:1 | 16.8:1 |
|  | S:Se | 1.36:1 | 3.11:1 |
|  | Zn:In | 31:1 | 49:1 |

Examples 1 to 5

Based on the results of Reference Example 2 and using an Effective Mass Analysis method, the core size, Zn:(In+Ga), S:Se, (In+Ga):(Se+S), and absorption ratio at 450 nm/350 nm, and absorption rate of the quantum dot polymer composite are calculated for a quantum dot having a core of $In_{1-x}Ga_xP$ and a shell of the same composition as that of Reference Example 2 and the results are summarized in Table 2.

TABLE 2

| $I_{PL}$ = 540 nm | x in $In_{1-x}Ga_xP$ | Core Size (nm) | Zn: (In + Ga) | S:Se | (In + Ga): (Se + S) | Absorption rate | $A_{450\,nm}$: $A_{350\,nm}$ |
| --- | --- | --- | --- | --- | --- | --- | --- |
| Example 1 | x = 0.1 | 2.3 | 26:1 | 1.2:1 | 1:22 = 0.0454:1 | 90% | 0.092:1 |
| Example 2 | x = 0.2 | 2.4 | 24:1 | 1.22:1 | 1:20 = 0.05:1 | 92% | 0.100:1 |
| Example 3 | x = 0.3 | 2.7 | 20:1 | 1.12:1 | 1:17 = 0.059:1 | 94% | 0.108:1 |
| Example 4 | x = 0.4 | 3.1 | 15:1 | 1.17:1 | 1:13 = 0.077:1 | 95% | 0.122:1 |
| Example 5 | x = 0.5 | 3.7 | 11:1 | 1:1 | 1:10 = 0.1:1 | 96% | 0.118:1 |

The results of Table 2 confirm that the quantum dot polymer composite including the quantum dots of Examples 1 to 5 may exhibit significantly improved absorption rate in comparison with Reference Example 2 and Comparative Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A quantum dot comprising
a semiconductor nanocrystal core comprising indium, gallium, and phosphorous,
a first semiconductor nanocrystal shell disposed on the semiconductor nanocrystal core, the first semiconductor nanocrystal shell comprising zinc and selenium, and
a second semiconductor nanocrystal shell disposed on the first semiconductor nanocrystal shell, the second semiconductor nanocrystal shell comprising zinc and sulfur,
wherein the quantum dot does not comprise cadmium,
wherein the quantum dot emits green light, and
wherein in the quantum dot, a mole ratio of gallium with respect to a sum of indium and gallium is less than or equal to about 0.5:1, and
a mole ratio of sulfur with respect to selenium is less than or equal to about 2.5:1.

2. The quantum dot of claim 1, wherein the semiconductor nanocrystal core comprises an InGaP alloy.

3. The quantum dot of claim 1, wherein a maximum luminescent peak of the green light is present in a range from about 500 nanometers to about 550 nanometers.

4. The quantum dot of claim 1, wherein in an ultraviolet-visible absorption spectrum of the quantum dot, a ratio of an absorption intensity at 450 nanometers to an absorption intensity at 350 nanometers is greater than or equal to about 0.08:1.

5. The quantum dot of claim 1, wherein in the quantum dot, a mole ratio of zinc with respect to a sum of indium and gallium is less than or equal to about 45:1.

6. The quantum dot of claim 1, wherein in the quantum dot, a mole ratio of zinc with respect to a sum of indium and gallium is greater than or equal to about 10:1 and less than or equal to about 30:1.

7. The quantum dot of claim 1, wherein in the quantum dot, a mole ratio of sulfur with respect to selenium is less than or equal to about 2:1.

8. The quantum dot of claim 1, wherein in the quantum dot, a mole ratio of sulfur with respect to selenium is greater than or equal to about 0.1:1 and less than or equal to about 1.4:1.

9. The quantum dot of claim 1, wherein in the quantum dot, a mole ratio of a sum of indium and gallium with respect to a sum of selenium and sulfur is greater than or equal to about 0.03:1 and less than or equal to about 0.1:1.

10. The quantum dot of claim 1, wherein a thickness of the first semiconductor nanocrystal shell is greater than or equal to about 3 monolayers.

11. The quantum dot of claim 1, wherein a thickness of the second semiconductor nanocrystal shell is less than 0.7 nanometers.

12. The quantum dot of claim 1, wherein a thickness of the first semiconductor nanocrystal shell is greater than or equal to about 0.9 nanometers and less than or equal to about 1.4 nanometers.

13. The quantum dot of claim 1, wherein a thickness of the second semiconductor nanocrystal shell is less than 0.6 nanometers.

14. The quantum dot of claim 1, wherein a quantum efficiency of the quantum dot is greater than or equal to about 70%.

15. The quantum dot of claim 1, wherein the first semiconductor nanocrystal shell does not comprise sulfur and is disposed directly on a surface of the semiconductor nanocrystal core, and wherein the second semiconductor nanocrystal shell is disposed directly on a surface of the first semiconductor nanocrystal shell and is an outermost layer of the quantum dot.

16. The quantum dot of claim 1, wherein a size of the semiconductor nanocrystal core is greater than or equal to about 2 nanometers and less than or equal to about 4 nanometers.

17. The quantum dot of claim 1, wherein a size of the quantum dot is greater than or equal to about 5 nanometers.

18. A quantum dot-polymer composite comprising:
a polymer matrix; and
a plurality of quantum dots dispersed in the polymer matrix, wherein the plurality of quantum dots comprises the quantum dot of claim 1.

19. The quantum dot-polymer composite of claim 18, wherein the polymer matrix comprises a carboxylic acid group containing a binder polymer, and wherein the carboxylic acid group containing the binder polymer comprises:
a copolymer of a monomer mixture comprising
a first monomer comprising a carboxylic acid group and a carbon-carbon double bond,
a second monomer comprising a carbon-carbon double bond and a hydrophobic moiety and not comprising a carboxylic acid group, and
optionally a third monomer comprising a carbon-carbon double bond and a hydrophilic moiety and not comprising a carboxylic acid group;
a multiple aromatic ring-containing polymer comprising a backbone structure in which two aromatic rings are bound to a quaternary carbon atom that is a constituent atom of another cyclic moiety in a main chain of the backbone structure, the multiple aromatic ring-containing polymer comprising a carboxylic acid group; or
a combination thereof.

20. The quantum dot-polymer composite of claim 18, wherein the polymer matrix comprises a polymerization product of a monomer combination including an ene compound including a carbon-carbon double bond and a poly thiol compound comprising at least two thiol group, or
wherein the quantum dot-polymer composite further comprises a metal oxide fine particle dispersed in the polymer matrix.

21. The quantum dot-polymer composite of claim 18, wherein the quantum dot-polymer composite is in the form of a patterned film.

22. The quantum dot-polymer composite of claim 18, wherein when the quantum dot-polymer composite is in the form of a film having a thickness of about 6 micrometers and an amount of the plurality of quantum dots is less than or equal to about 45% by weight, based on a total weight of the composite, an absorption of blue light of a wavelength of about 450 nanometers is greater than or equal to about 89%.

23. A display device, comprising
a light source and
a light emitting element,
wherein the light emitting element comprises the quantum dot-polymer composite of claim 18 and the light source is configured to provide the light emitting element with incident light.

24. The display device of claim 23, wherein the incident light has a luminescence peak wavelength of about 440 nanometers to about 460 nanometers.

25. The display device of claim 23, wherein, the light emitting element comprises a sheet comprising the quantum dot-polymer composite.

26. The display device of claim 23, wherein the light emitting element comprises a stacked structure comprising a substrate and a light emitting layer disposed on the substrate,
wherein the light emitting layer comprises a pattern comprising the quantum dot-polymer composite, and
wherein the pattern comprises at least one repeating section emitting light of a predetermined wavelength.

27. The display device of claim 26, wherein the pattern comprises a first section configured to emit a first light and a second section configured to emit a second light having a center wavelength that is different from a center wavelength of the first light.

* * * * *